(12) United States Patent
Trpkovski

(10) Patent No.: US 7,025,850 B2
(45) Date of Patent: Apr. 11, 2006

(54) METHODS AND APPARATUS FOR MASKING A WORKPIECE

(75) Inventor: Paul Trpkovski, Buffalo, WY (US)

(73) Assignee: Cardinal Glass Industries, Inc., Spring Green, WI (US)

( * ) Notice: Subject to any disclaimer, the term of this patent is extended or adjusted under 35 U.S.C. 154(b) by 311 days.

(21) Appl. No.: 10/403,644

(22) Filed: Mar. 31, 2003

(65) Prior Publication Data

US 2004/0031215 A1 Feb. 19, 2004

Related U.S. Application Data

(63) Continuation-in-part of application No. 09/940,970, filed on Aug. 28, 2001.

(51) Int. Cl.
*B32B 31/04* (2006.01)

(52) U.S. Cl. .............. 156/297; 156/252; 156/256; 156/260; 156/264; 156/270; 156/299; 156/300; 156/301; 156/302; 156/304.1

(58) Field of Classification Search .............. 156/71, 156/108, 109, 250, 252, 256–260, 264, 270, 156/271, 297, 299, 300, 301–302, 304.1, 156/510, 512, 522–523, 527, 539, 543–544, 156/556, 558, 560, 574, 577; 428/41.7, 41.8, 428/40.1, 78, 189, 192, 343, 355 RA, 426; 52/DIG. 12, 741.3

See application file for complete search history.

(56) References Cited

U.S. PATENT DOCUMENTS

| | | | |
|---|---|---|---|
| 1,256,818 A | 2/1918 | Nile | |
| 1,284,997 A | 11/1918 | Bigler | |
| 1,562,948 A | 11/1925 | Elliott | |
| 1,843,432 A | 2/1932 | Nickerson | |
| 2,004,878 A | 6/1935 | MacNaught | |
| 2,372,982 A | 4/1945 | Richards et al. | |
| 2,817,399 A | 12/1957 | Donaldson et al. | |
| 2,917,789 A | 12/1959 | Le Bon, III | |
| 2,979,025 A | 4/1961 | Mund | |
| 2,990,081 A | 6/1961 | De Neui et al. | |
| 3,023,464 A | 3/1962 | Zerbe | |
| 3,047,142 A | 7/1962 | Heffley | |
| 3,077,059 A | 2/1963 | Stout | |
| 3,139,352 A | 6/1964 | Coyner | |
| 3,339,318 A * | 9/1967 | Graf et al. .............. | 451/42 |
| 3,358,355 A | 12/1967 | Youssi et al. | |
| 3,473,988 A | 10/1969 | Rullier et al. | |

(Continued)

FOREIGN PATENT DOCUMENTS

CA 2085109 12/1991

(Continued)

OTHER PUBLICATIONS

International Search Report, Application No. PCT/US2004/006490.

*Primary Examiner*—Jessica Rossi
(74) *Attorney, Agent, or Firm*—Fredrikson & Byron, P.A.

(57) ABSTRACT

Methods and apparatus for masking a planar surface and providing information at the point of use of an assembly including the planar surface are disclosed. In one advantageous method in accordance with the present invention, a masking material comprising a substrate and an adhesive disposed over a first face of the substrate is provided. One or more strips of masking material are applied to a planar surface, and an information bearing sheet is applied over the one or more strips of masking material.

35 Claims, 32 Drawing Sheets

U.S. PATENT DOCUMENTS

| | | | |
|---|---|---|---|
| 3,523,053 A * | 8/1970 | Zbinden et al. ............. 156/523 |
| 3,575,790 A | 4/1971 | Fleck |
| 3,743,150 A | 7/1973 | Eckart, Jr. |
| 3,760,860 A | 9/1973 | Kelarakis |
| 3,775,219 A | 11/1973 | Karlson et al. |
| 3,837,949 A | 9/1974 | Eckart, Jr. |
| 3,863,601 A | 2/1975 | Eckart, Jr. |
| 3,871,940 A | 3/1975 | Antonioni |
| 3,891,486 A | 6/1975 | Willdorf |
| 4,000,593 A | 1/1977 | Cypher |
| 4,041,663 A | 8/1977 | Mazzoni |
| 4,070,781 A | 1/1978 | Sauer |
| 4,075,386 A | 2/1978 | Willdorf |
| 4,168,978 A | 9/1979 | Koenig |
| 4,233,796 A | 11/1980 | Mazzoni et al. |
| 4,235,192 A | 11/1980 | Brubaker |
| 4,338,149 A | 7/1982 | Quaschner |
| 4,443,283 A * | 4/1984 | Sarkisian ............... 156/211 |
| 4,477,304 A * | 10/1984 | Westermann ............ 156/250 |
| 4,610,115 A | 9/1986 | Thompson, Jr. |
| 4,616,456 A | 10/1986 | Parker |
| 4,657,796 A | 4/1987 | Musil et al. |
| 4,822,649 A | 4/1989 | Canaud et al. |
| 4,889,759 A | 12/1989 | Yamazaki |
| 4,931,134 A | 6/1990 | Adams, Jr. et al. |
| 4,940,622 A | 7/1990 | Leavitt, Sr. et al. |
| 4,952,430 A | 8/1990 | Bowser et al. |
| 4,971,130 A | 11/1990 | Bentley |
| 4,996,808 A | 3/1991 | Weaver |
| 4,997,687 A | 3/1991 | Carter |
| 4,999,147 A | 3/1991 | Kojima et al. |
| 5,015,326 A | 5/1991 | Frank |
| 5,020,288 A | 6/1991 | Swensen |
| 5,049,445 A | 9/1991 | Arvidsson et al. |
| 5,076,775 A | 12/1991 | Leyens |
| 5,107,643 A | 4/1992 | Swensen |
| 5,113,921 A | 5/1992 | Pool |
| 5,131,967 A | 7/1992 | Tweadey, II et al. |
| 5,201,946 A | 4/1993 | Marsek |
| 5,264,099 A | 11/1993 | Szczyrbowski et al. |
| 5,330,232 A | 7/1994 | Smith |
| 5,411,760 A | 5/1995 | Woodhall et al. |
| 5,439,716 A | 8/1995 | Larsen |
| 5,453,459 A | 9/1995 | Roberts |
| 5,468,538 A | 11/1995 | Nameche |
| 5,557,899 A | 9/1996 | Dube et al. |
| 5,599,422 A | 2/1997 | Adams, Jr. et al. |
| 5,603,190 A | 2/1997 | Sanford |
| 5,618,582 A | 4/1997 | VanWinckel |
| 5,735,089 A | 4/1998 | Smith et al. |
| 5,757,564 A | 5/1998 | Cross et al. |
| 5,761,860 A | 6/1998 | Koike et al. |
| 5,773,110 A | 6/1998 | Shields |
| 5,866,199 A | 2/1999 | Swidler et al. |
| 5,866,260 A | 2/1999 | Adams, Jr. et al. |
| 5,873,203 A | 2/1999 | Thiel |
| 5,935,669 A | 8/1999 | Leeuwenburgh |
| 5,992,107 A | 11/1999 | Poirier |
| 5,992,888 A | 11/1999 | North et al. |
| 6,080,261 A | 6/2000 | Popat et al. |
| 6,099,927 A | 8/2000 | Freedman |
| 6,123,361 A | 9/2000 | Cohen |
| 6,124,044 A | 9/2000 | Swidler |
| 6,129,959 A | 10/2000 | Mercer et al. |
| 6,158,483 A | 12/2000 | Trpovski |
| 6,258,199 B1 | 7/2001 | Lingamfelter et al. |
| 6,334,631 B1 | 1/2002 | Hollander |
| 6,338,503 B1 | 1/2002 | Hollander |
| 6,364,362 B1 | 4/2002 | Severin |
| 6,375,225 B1 | 4/2002 | Lapsker |
| 6,489,024 B1 | 12/2002 | Griffith, Jr. et al. |
| 2001/0030420 A1 | 10/2001 | Zborovsky-Fenster et al. |
| 2001/0048222 A1 | 12/2001 | Mitchell |
| 2002/0043089 A1 | 4/2002 | Zorn |
| 2002/0043798 A1 | 4/2002 | Engel |
| 2003/0041532 A1 | 3/2003 | Trpkovski |
| 2003/0070391 A1 | 4/2003 | Tachauer et al. |

FOREIGN PATENT DOCUMENTS

| | | |
|---|---|---|
| DE | 3733841 * | 4/1989 |
| DE | 196 06 395 C1 | 10/1997 |
| DE | 297 17 810 U | 2/1999 |
| EP | 0 807 611 A1 | 11/1997 |
| GB | 2 033 947 A | 5/1980 |
| GB | 2 227 270 A | 7/1990 |
| GB | 2308829 A | 7/1997 |
| JP | 09262736 | 7/1997 |
| WO | WO 91/19878 | 12/1991 |
| WO | WO 00/21734 A | 4/2000 |
| WO | WO 00/36260 A | 6/2000 |
| WO | WO 00/77111 A2 | 12/2000 |
| WO | WO 01/02496 | 1/2001 |

* cited by examiner

METHODS AND APPARATUS FOR MASKING A WORKPIECE

RELATED APPLICATIONS

This application is a continuation-in-part of U.S. patent application Ser. No. 09/940,970 by Trpkovski filed Aug. 28, 2001, which is hereby incorporated, in its entirety, by reference. The present application is related to copending and commonly assigned U.S. patent applications Ser. Nos. 10/076,211; 10/227,979; and 10/323,594, which are hereby incorporated, in their entireties, by reference.

FIELD OF THE INVENTION

The present invention relates generally to methods and apparatus for masking a workpiece. More particularly, the present invention relates to methods and apparatus for masking a planar surface of an insulating glass unit and providing information at the point of use of the insulating glass unit

BACKGROUND OF THE INVENTION

In most industrialized countries, windows touch people's lives everyday. Wherever people work and live there are windows. Windows allow the occupants of a building to view the outside world while allowing sun light to enter the interior of the building. Sunlight is a natural antidepressant and helps the human body produce vitamin D. Thus, a certain amount of sunshine is essential to mental and physical well being.

In extreme climates significant energy may be lost through windows during the winter when a building is being heated, and/or during the summer when a building is being cooled. With the rising cost of energy, efforts have been made to provide homes and other buildings with insulation that will more efficiently prevent the transfer of heat between the inside and the outside of a building. Insulating glass units have been developed to reduce the amount of heat transfer through windows.

There are basically three types of insulating glass units commercially available today. These three types are often referred to as single glazing, double glazing, and triple glazing. Double glazed insulating glass units are the most common. These insulating glass units include a space sealed between two panes of glass. This sealed space provides insulation, the insulating effect may be enhanced by filling the space with an insulative gas such as argon, or krypton. Compared with a single pane, a double glazed insulating glass unit can cut heat loss through a window nearly in half.

Because of the dramatic energy savings which can be achieved with insulating glass units, building codes in many jurisdictions have been revised to require the installation of insulating glass units. The relative energy performance of these insulating glass units is clearly an important factor to be considered when windows are purchased by a consumer. The federal government of the United States of America has developed an Energy Star designation which may be used to identify windows which meet certain energy performance criteria. In another attempt to help consumers make informed decisions regarding window purchases, the National Fenestration Rating Council (NFRC) has recently instituted new labeling requirements for windows. The NFRC requirements include both a permanent marking and a temporary label. The NFRC label includes ratings for U-factor, Solar Heat Gain Coefficient (SHGC), Visible Transmittance (VT), and air leakage (AL). These ratings must be provided for both residential and non-residential applications. All of these ratings typically vary from one window to the next. The labeling of windows may also include additional information such as a model number, the window style, the window dimensions, and a date code. This information also typically varies from one window to the next. The labeling requirements described above present a challenge to window manufacturers since a great deal of information is required, and since this information frequently varies from one window to the next.

Human beings have a relatively narrow temperature range in which they are comfortable. Unfortunately, infrared (IR) energy from the sun entering a room through a window can quickly raise the temperature to an uncomfortable level. Many windows include low emissivity coatings that have been developed to prevent heat spikes within a room by reflecting a large portion of incident infra red energy. Recently, self cleaning coatings have also been developed for use on window glass. These coatings may eliminate the need to clean the glass of an insulating glass unit.

Because the glass of an insulating glass unit typically includes special coatings, temporary labels that are applied to the glass are typically manufactured using special paper and special inks so that the coatings on the glass will not be damaged. The coatings on an insulating glass unit may also be damaged during transportation to a building site, or during the building process. The building process typically involves the efforts of a variety of crafts people such as carpenters, masons, and painters. During the building process the coatings on an insulating glass unit can be scratched or covered with paint.

SUMMARY OF THE INVENTION

The present invention relates generally to methods an apparatus for masking workpieces (e.g., multiple-pane insulating glass units). In one advantageous method in accordance with the present invention, a first strip of masking material is placed on a workpiece in a position such that a first portion of an unmasked apron of the workpiece extends between a first end of the first strip and an outer periphery of the workpiece and a second portion of the unmasked apron extends between a first side of the first strip and the outer periphery of the workpiece. A cut may be formed in the masking material to define a second end of the first strip. In some advantageous embodiments, the cut is located so that the first strip has a length selected such that a third portion of the unmasked apron of the workpiece will extend between the second end of the first strip and the outer perimeter of the workpiece when a second section of the first strip is adhered to the workpiece.

The first strip may form all or part of a protective covering. In some implementations, the protective covering comprises a plurality of strips disposed in an overlapping fashion. In some advantageous implementations, the protective covering is sized and positioned so that an unmasked apron of the workpiece extends between an outer periphery of the protective covering and an outer periphery of the workpiece. In some particularly advantageous implementations, the width of the unmasked apron is large enough so that the unmasked apron can receive a sash, and small enough so that the protective covering protects a portion of the pane that is not covered by the sash.

In some exemplary implementations the protective covering is formed using a masking material comprising a substrate having an adhesive side and a non-adhesive side.

A method of forming the protective covering may include the step of trapping the substrate between a first tool and a second tool with a tail of the substrate extending beyond the second tool and the adhesive side of the substrate contacting the first tool. The tail may be urged, for example by a stream of air, to lay across a face of the second tool with the non-adhesive side of the substrate contacting the face of the second tool. Some advantageous methods include the step of trapping the tail between the face of the second tool and a workpiece with the adhesive side of the substrate contacting the workpiece. In some methods in accordance with the present invention, the first tool is moved away from the adhesive side of the substrate while the substrate is trapped between the face of the second tool and the workpiece.

Some methods in accordance with the present invention include the step of apply a first section of masking material onto the workpiece by moving the second tool a first distance. For example, the second tool may be moved in a direction generally parallel to the surface of the workpiece to press the first section of the masking material against the surface of the workpiece. A method in accordance with the present invention may also include the step of creating a cut in the masking material to define a second end of a first strip. In some useful methods, the cut is located so that the first strip has a pre-selected length. In some particularly useful methods, the first distance is less than a pre-selected length of the first strip so that a second section of the first strip is not in contact with the workpiece during the step of creating a cut in the masking material to define the second end of the first strip. Also in some useful methods, the pre-selected length is selected so that a third portion of an unmasked apron of the workpiece will extend between the second end of the first strip and an outer periphery of the workpiece when a second section of the first strip is applied to the workpiece.

In some useful methods in accordance with the present invention, the step of trapping the tail between the second tool and the workpiece comprises the step of positioning a first end of the masking material so that a first portion of an unmasked apron of the workpiece extends between the first end of the first strip and a periphery of the workpiece. The step of trapping the tail between the second tool and the workpiece may also advantageously comprise the step of positioning the tail of the masking material so that a second portion of the unmasked apron extends between a first side of the masking material and the periphery of the workpiece.

In some cases a cut is formed in a section of the masking material that is not in contact with the workpiece. In some methods, the masking material may be trapped between the first tool and a third tool and a cut may be formed in a section of the masking material extending between the third tool and the workpiece.

In one advantageous method in accordance with the present invention, a first strip of masking material is placed on a workpiece in a position such that a second portion of an unmasked apron of the workpiece extends between a first side of the first strip and the outer periphery of the workpiece. A pre-selected number of additional strips are applied to the workpiece in an overlapping fashion according to a pre-selected overlap dimension so that a fourth portion of the unmasked apron extends between a second side of a final additional strip and the outer periphery of the workpiece. In some cases, the workpiece comprises a window pane and the first and second portions of the unmasked apron have widths that are large enough to allow the first and second portions of the unmasked apron to mate with a window sash. In some cases, the workpiece comprises a window pane and the first and second portions of the unmasked apron have widths that are small enough that the strips protect a viewing portion of the window pane.

Methods in accordance with the present invention may be used to provide information at the point of use of a window assembly. In one advantageous method in accordance with the present invention, a masking material comprising a substrate and an adhesive disposed over a first face of the substrate is provided. One or more strips of masking material are applied to a surface of a pane of the window assembly, and information is printed on a second face of the substrate of the one or more strips of masking material.

In certain implementations, the step of printing information on the second face of the substrate of the one or more strips of masking material occurs before the step of applying the one or more strips of masking material to the surface of the pane. In other implementations, the step of printing information on the second face of the substrate of the one or more strips of masking material occurs after the step of applying the one or more strips of masking material to the surface of the pane.

In another advantageous method in accordance with the present invention, a masking material comprising a substrate and an adhesive disposed over a first face of the substrate is provided. One or more strips of masking material are applied to a surface of a pane of a window assembly, and an information bearing sheet is applied over the one or more strips of masking material. In certain implementations, the information bearing sheet comprises a sheetstock and a second adhesive disposed upon a first face of the sheetstock. In one aspect of the invention, the second adhesive has substantially greater adhesion than the first adhesive. In another aspect of the invention, the sheetstock comprises a substantially frangible material (e.g., paper).

A window assembly in accordance with one implementation of the present invention includes an insulating glass unit including a first pane having a first surface. A protective covering is advantageously disposed over a masked portion of the first surface of the first pane. In certain implementations, the protective covering comprises a plurality of strips disposed across the first surface of the first pane, and the first surface of the first pane has an unmasked apron extending between an outer periphery of the protective covering and an outer periphery of the first pane.

In certain implementations, the plurality of strips are disposed in a sequentially overlapping fashion with each subsequent strip overlapping a portion of a preceding strip. When this is the case, the protective covering can be easily removed by grasping the lower-most strip and removing the protective covering as a single unit. In certain implementations, the plurality of strips may comprise n strips with the nth strip partially overlapping an (n-1) strip of the plurality of protective strips. When this is the case, the first strip may include indicia indicating that the first strip should be the first one removed.

In an advantageous implementation, the window assembly may further include an information bearing sheet overlaying the protective covering. In certain implementations, the information bearing sheet comprises a sheetstock having a first side and a second side. The sheetstock of the information bearing sheet may include first indicia printed on a first side thereof and second indicia printed on a second side thereof. The information bearing sheet may also include a second adhesive overlaying the first indicia and the first side of the sheetstock. In an advantageous implementation, the second adhesive has substantially greater adhesion than the first adhesive.

In certain implementations, the second adhesive and the protective covering are both substantially transparent to allow viewing of the first indicia therethrough. In some implementations, the second adhesive and the protective covering may both be substantially translucent. In some cases the information bearing sheet may include indicia comprising an advertisement for goods likely to be purchased by a user of the window assembly. Additionally, the information bearing sheet may include indicia comprising a National Fenestration Rating Council rating for the window assembly.

Methods in accordance with the present invention may be used to protect a masked area of a planar surface. In one such method, a masking material having a known width is provided, and the width of the masking material is provided to a masking calculator. A desired width of the area to be masked is also provided to the masking calculator. The masking calculator may then be instructed to determine an optimal number of strips. The masking calculator may also advantageously calculate an overlap dimension. The optimal number of strips may be applied to the planar surface in an overlapping fashion according to the overlap dimension. In certain implementations, the strips are applied in a sequential fashion with each subsequent strip partially overlapping a preceding strip by the overlap dimension. In some implementations, the step of providing the desired width of the masked area to the masking calculator includes the step of detecting a dimension of the planar surface.

Methods in accordance with the present invention may be used to mask insulating glass units of various sizes. In one method in accordance with the present invention, a width of a masking material is selected so that a small sized insulating glass assembly can be masked with a single strip of the masking material. Larger size insulating glass assemblies can be masked with a plurality of strips of masking material.

In certain implementations, a plurality of strips may be applied to a surface of an insulating glass unit to form a protective covering. In an advantageous implementation, these strips may be located so that they define an unmasked apron extending between an outer periphery of the protective covering and an outer periphery of the insulating glass unit. When this is the case, trimming of the protective covering is typically not required. This is advantageous since, in some cases, trimming of masking material (for example with a blade) may result in damage to the coatings of an insulating glass unit.

Many factors are driving changes in insulating glass unit manufacturing. As describe above, the National Fenestration Rating Council (NFRC) has recently instituted new labeling requirements for windows. The NFRC requirements include both a permanent marking and a temporary label. The NFRC label includes ratings for U-factor, Solar Heat Gain Coefficient (SHGC), Visible Transmittance (VT), and air leakage (AL). These ratings must be provided for both residential and non-residential applications. The labeling of windows may include additional information such as a model number, the window style, the window dimensions, and a date code.

The labeling requirements described above present a challenge to window manufacturers since a great deal of information is required, and since this information frequently varies from one window to the next. A typical insulating glass production line may produce a number of different models on a made to order basis. As insulating glass units move down a production line, each insulating glass unit may have different labeling requirements. Methods in accordance with the present invention, may be used to provide labeling which is matched to each particular insulating glass unit.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
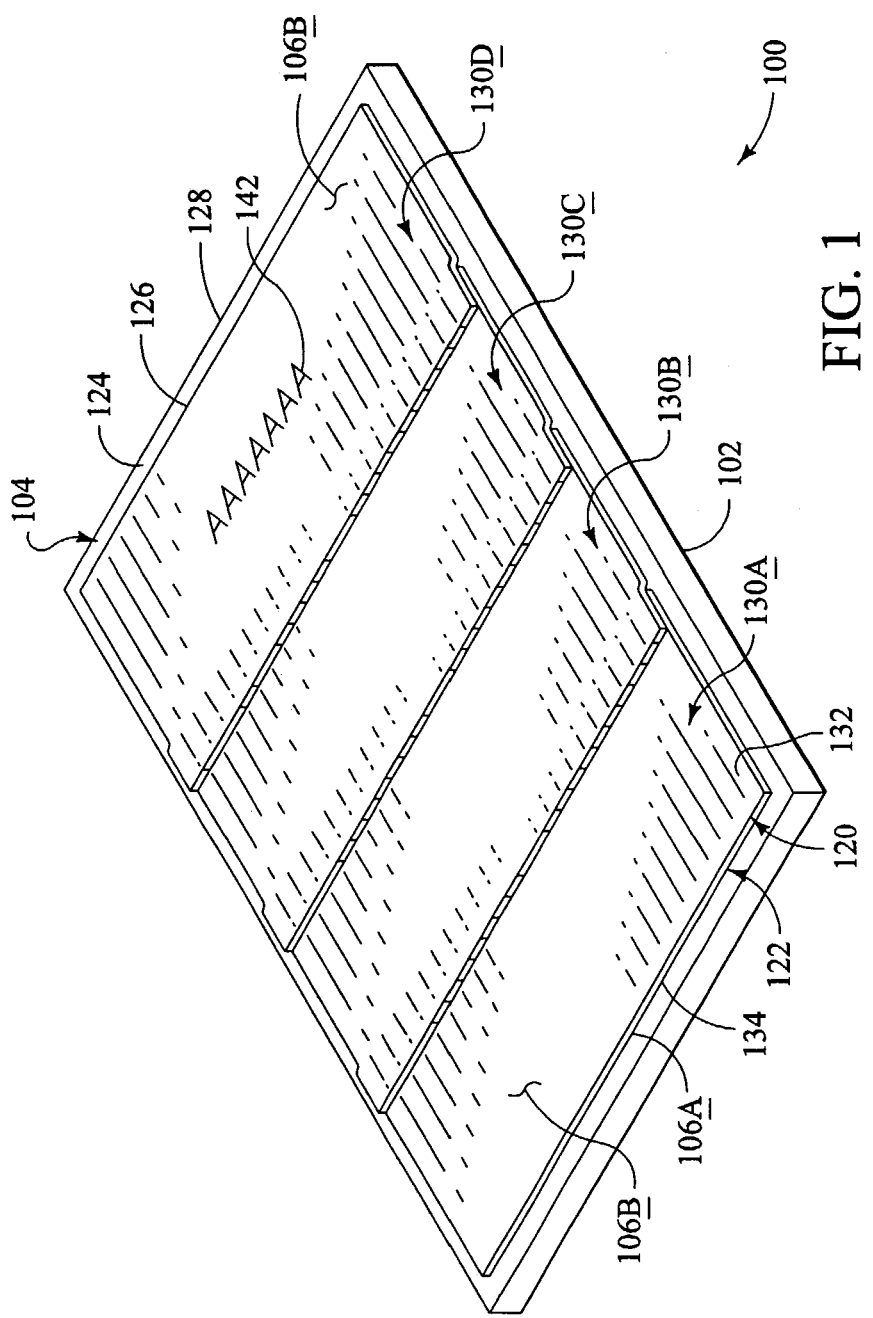
FIG. 1 is a perspective view of an assembly in accordance with an exemplary embodiment of the present invention.

FIG. 1 is a perspective view of an assembly 100 in accordance with an exemplary embodiment of the present invention. Assembly 100 includes a pane 102 having a first surface 104. A protective covering 120 is disposed over a masked portion 122 of first surface 104 of pane 102. In the embodiment of FIG. 1, protective covering 120 comprises a plurality of strips. First surface 104 of pane 102 also includes an unmasked apron 124 extending between an outer periphery 126 of protective covering 120 and an outer periphery 128 of pane 102.

In the embodiment of FIG. 1, the strips forming protective covering 120 are disposed in a sequentially overlapping fashion with each subsequent strip overlapping a portion of a preceding strip so that the protective covering can be easily removed one strip at a time. More particularly, protective covering 120 includes a first strip 130A and a second strip 130B which partially overlaps first strip 130A. Protective covering 120 also includes a third strip 130C which partially overlaps second strip 130B. It is to be appreciated that protective covering 120 may comprise any number of strips without deviating from the spirit and scope of the present invention.

In a preferred embodiment, each strip comprises a substrate 132 having a first surface 106A and a second surface 106B. In a useful embodiment, each strip includes a first adhesive 134 disposed upon first surface 106A of substrate 132. In the embodiment of FIG. 1, a fourth strip 130D of protective covering 120 includes an indicia 142 disposed upon second surface 106B of substrate 132.

Various embodiments of indicia 142 are possible without deviating from the spirit and scope of the present invention. For example, indicia 142 may include instructions, technical information, and/or advertisements. For example, indicia 142 may include instructions for removing protective covering 120. More particularly, indicia 142 may include instructions indicating which strip of protective covering 120 should be removed first.

Assembly 100 of FIG. 1 may be used in conjunction with methods in accordance with the present invention. For example, a method of providing information at the point of use of pane 102 may include the following steps. 1) Providing a masking material comprising a substrate 132 and a first adhesive 134 disposed upon a first surface of the substrate. 2) Applying a succession of strips to a first surface 104 of pane 102 in an overlapping fashions with each subsequent strip partially overlapping a preceding strip by an overlap dimension. 3) Printing information on the second surface of the substrate of at least one of the strips. Additional methods are possible without deviating from the spirit and scope of the present invention. For example, a method in accordance with the present invention may include the step of providing a masking material having a substrate with indicia printed on the second surface thereof prior to applying the substrate to the first surface of pane 102.

Pane 102 may comprise various materials without deviating from the spirit and scope of the present invention. Examples of materials which may be suitable in some applications which may include glass, metal, and plastics. Likewise, substrate 132 may comprise various materials without deviating from the spirit and scope of the present invention. Examples of materials which may be suitable in some applications include paper, metal foil, and polymeric film. Examples of polymeric materials which may be suitable in some applications include: polyethylene (PE), polypropylene (PP), polyvinyl chloride (PVC), polyurethane, polytetrafluoroethylene (PTFE), polyester (e.g., PET), polyamide, and polyimide.

Figure 2:
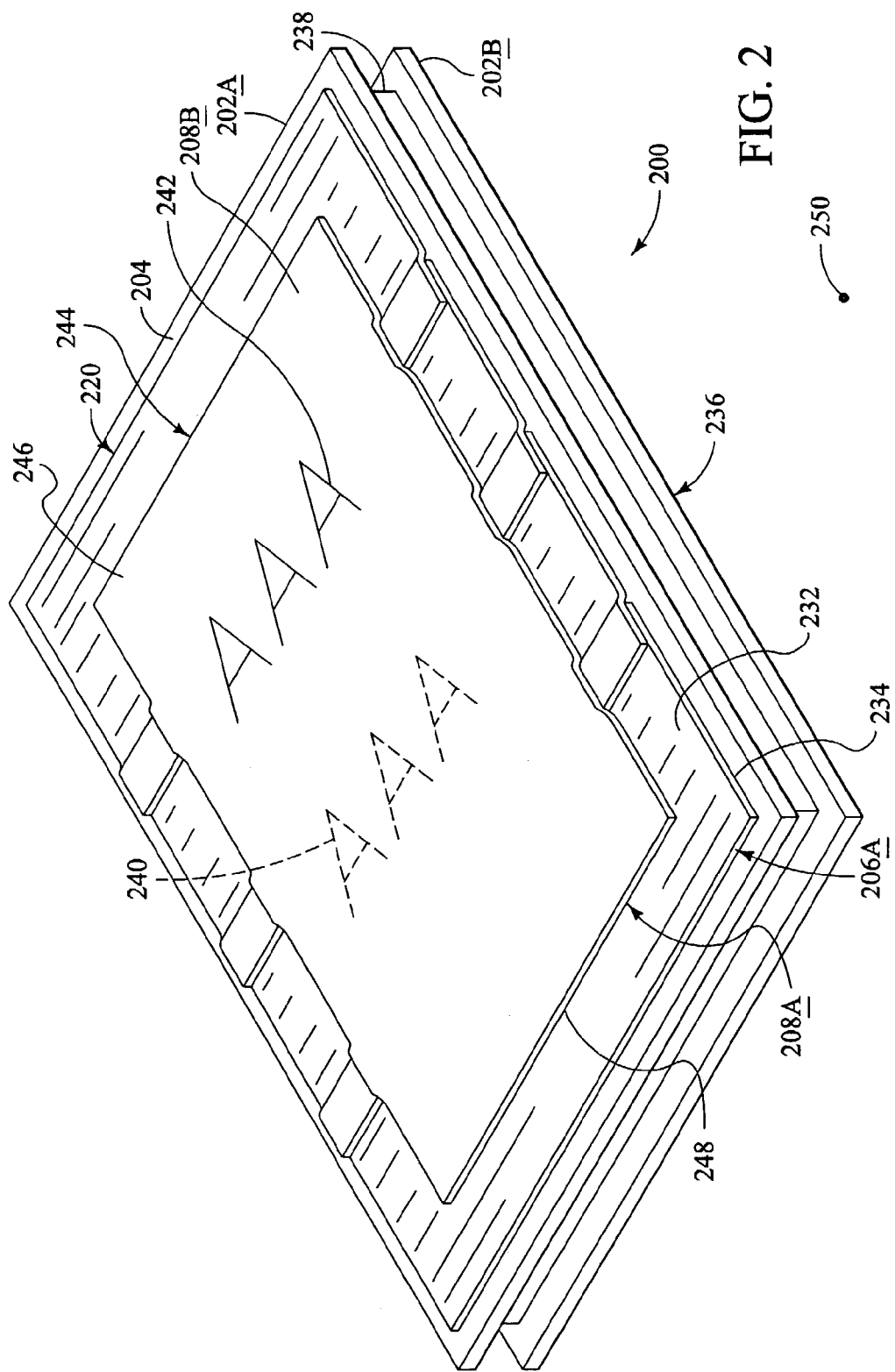
FIG. 2 is a perspective view of an assembly in accordance with an additional exemplary embodiment of the present invention.

FIG. 2 is a perspective view of an assembly 200 in accordance with an additional exemplary embodiment of the present invention. Assembly 200 includes an insulating glass unit 236. Insulating glass unit 236 includes a first pane 202A, a second pane 202B and a spacer 238 interposed between first pane 202A and second pane 202B. First pane 202A, second pane 202B, and spacer 238 preferably define a interpane space. In some embodiments, an insulative gas (e.g., argon, krypton, and/or others) may be disposed within the interpane space. Embodiments are also possible in which the interpane space contains air or vacuum. Insulating glass unit 236 may be generally referred to as a double glazed insulating glass unit. Other embodiments of insulating glass unit 236 are possible without deviating from the spirit and scope of the present invention. For example, insulating glass unit 236 may be a single glazed insulating glass unit, or a triple glazed insulating glass unit.

First pane 202A of insulating glass unit 236 has a first surface 204. In the embodiment of FIG. 2, a protective covering 220 is disposed over first surface 204 of first pane 202A. In FIG. 2 it may be appreciated that, an information bearing sheet 244 is disposed over protective covering 220. In the embodiment of FIG. 2, information bearing sheet 244 comprises a sheetstock 246 and a second adhesive 248 overlaying a first surface 208A of sheetstock 246.

In the embodiment of FIG. 2, protective covering 220 comprises a plurality of strips, each comprising a substrate 232 having a first surface 206A and a first adhesive 234 disposed over first surface 206A. In a useful embodiment, first adhesive 234 and second adhesive 248 may be selected such that second adhesive 248 has greater adhesion than first adhesive 234. In this useful embodiment, first adhesive 234 may have a level of adhesion to first pane 202A which is selected so that substrate 232 can be easily removed from first pane 202A. Also in this useful embodiment, second adhesive 248 may have a level of adhesion that is selected to firmly adhere sheetstock 246 of information bearing sheet 244 to the strips of substrate 232 and to provide mechanical support for the strips. In a preferred embodiment, sheetstock 246 of information bearing sheet 244 comprises a frangible material. In this preferred embodiment, information bearing sheet 244 may be configured to tear when each strip is removed from first pane 202A. Examples of frangible materials which may be suitable in some applications include paper.

In the embodiment of FIG. 2, a second indicia 242 is disposed on a second surface 208B of sheetstock 246 of information bearing sheet 244. Information bearing sheet 244 also includes a first indicia 240 printed on the first surface 208A of sheetstock 246 of information bearing sheet 244. In a preferred embodiment, first indicia 240 is visible to a viewer located at a point 250 located beyond one side of insulating glass unit 236. In this preferred embodiment, substrate 232 and first adhesive 234 of protective covering 220 are both substantially optically transparent and/or translucent. Also in this preferred embodiment, first pane 202A and second pane 202B are both substantially optically transparent. Finally, in this preferred embodiment, second adhesive 248 of information bearing sheet 244 is preferably also optically transparent and/or translucent.

Figure 3:
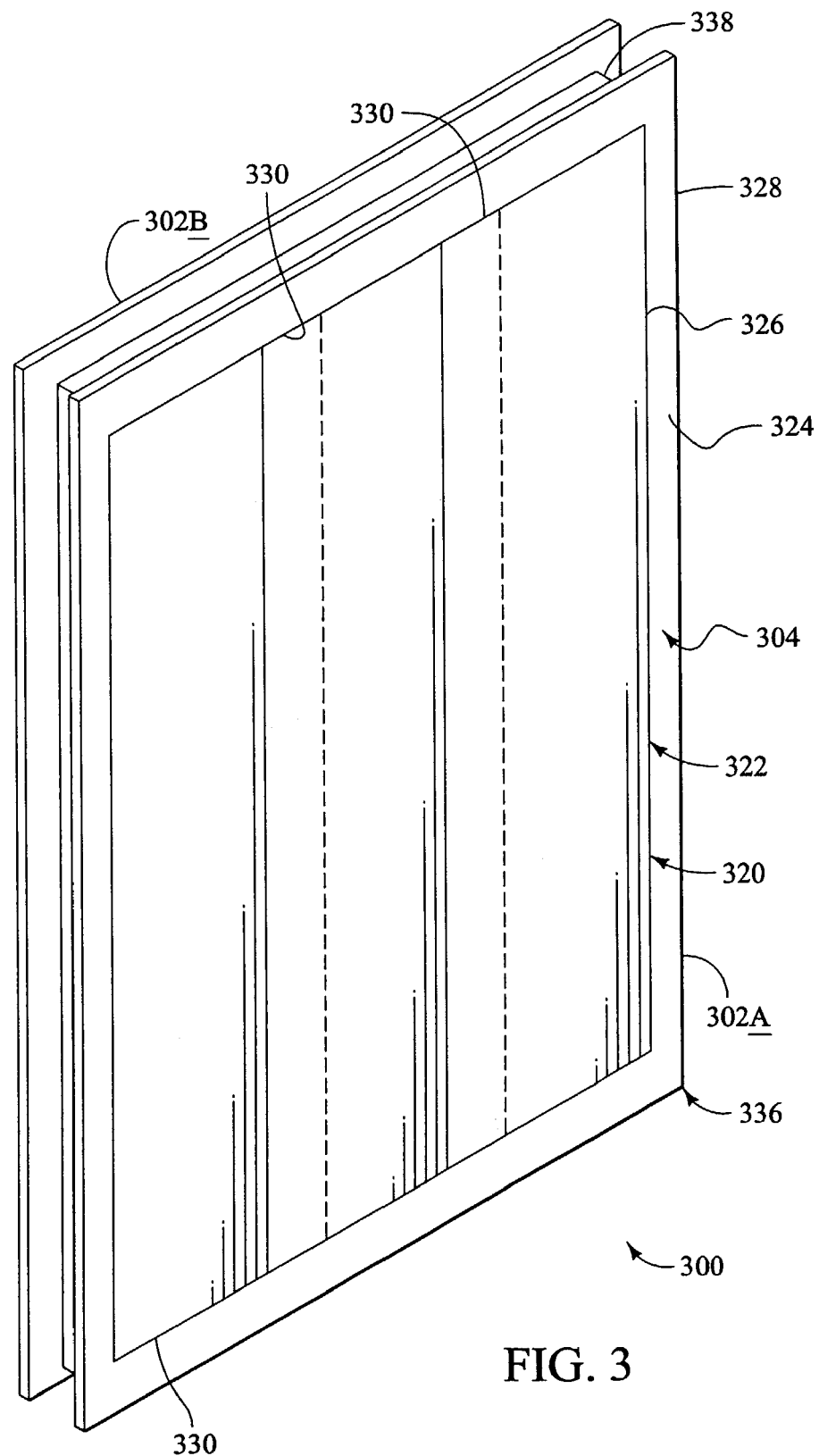
FIG. 3 is a perspective view of an assembly in accordance with yet another exemplary embodiment of the present invention.

FIG. 3 is a perspective view of an assembly 300 in accordance with yet another exemplary embodiment of the present invention. Assembly 300 includes an insulating glass unit 336 having a first pane 302A. A protective covering 320 is disposed over a masked portion 322 of a first surface 304 of first pane 302A. In the embodiment of FIG. 3, protective covering 320 comprises a plurality of strips 330. First surface 304 of first pane 302A also has an unmasked apron 324 extending between an outer periphery 326 of protective covering 320 and an outer periphery 328 of first pane 302A. In FIG. 3, it may be appreciated that insulating glass unit 336 of assembly 300 includes a second pane 302B and a spacer 338.

Figure 4:
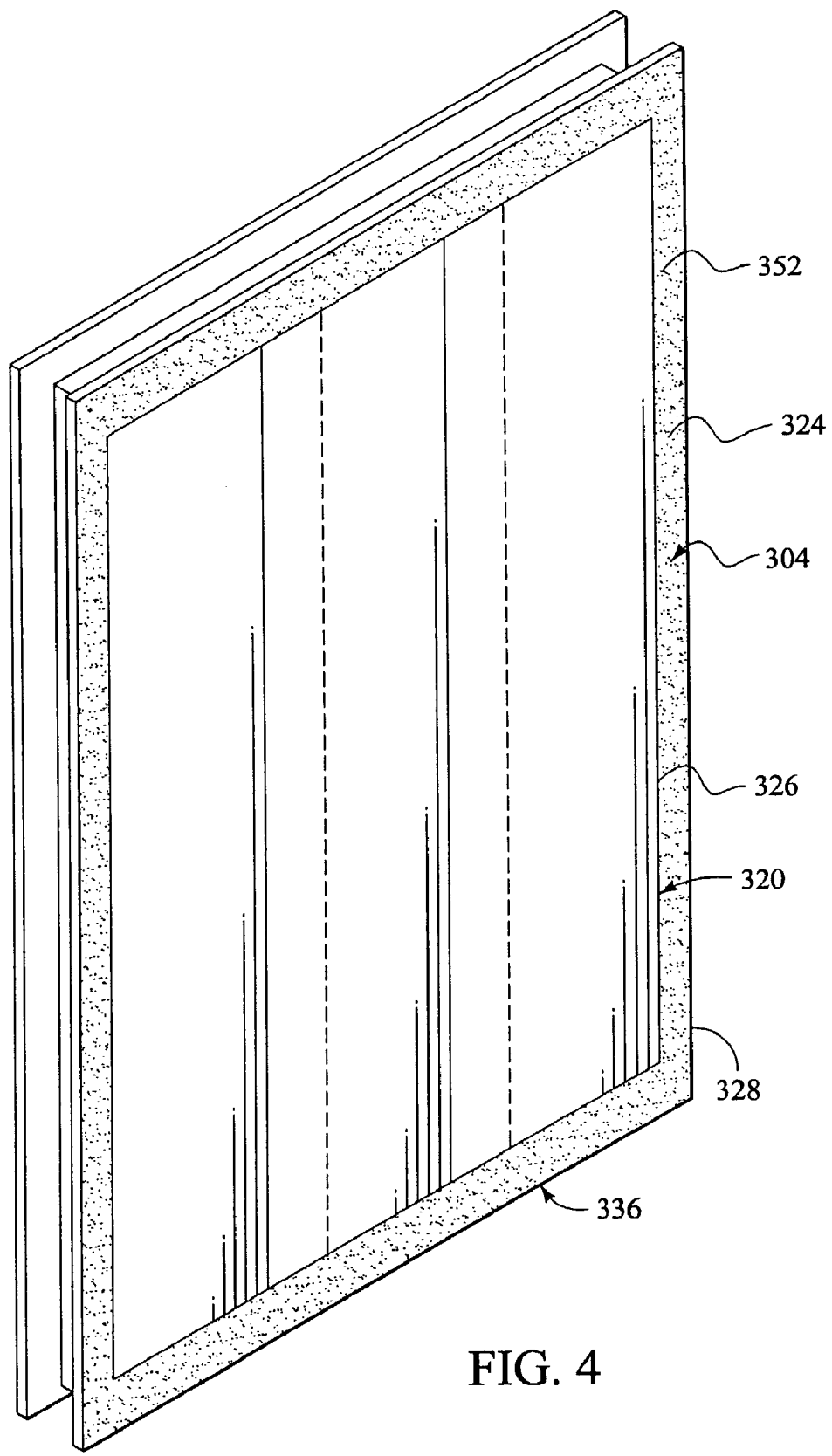
FIG. 4 is a perspective view of an additional assembly including an insulating glass unit and a protective covering from the assembly of FIG. 3.

FIG. 4 is a perspective view of an additional assembly including insulating glass unit 336 and protective covering 320 from the assembly of FIG. 3. As described above, protective covering 320 has an outer periphery 326, and first surface 304 of first pane 302A includes an unmasked apron 324 extending between outer periphery 326 of protective covering 320 and an outer periphery 328 of first pane 302A. In the embodiment of FIG. 4, a glue 352 has been applied to unmasked apron 324 of first pane 302A.

Figure 5:
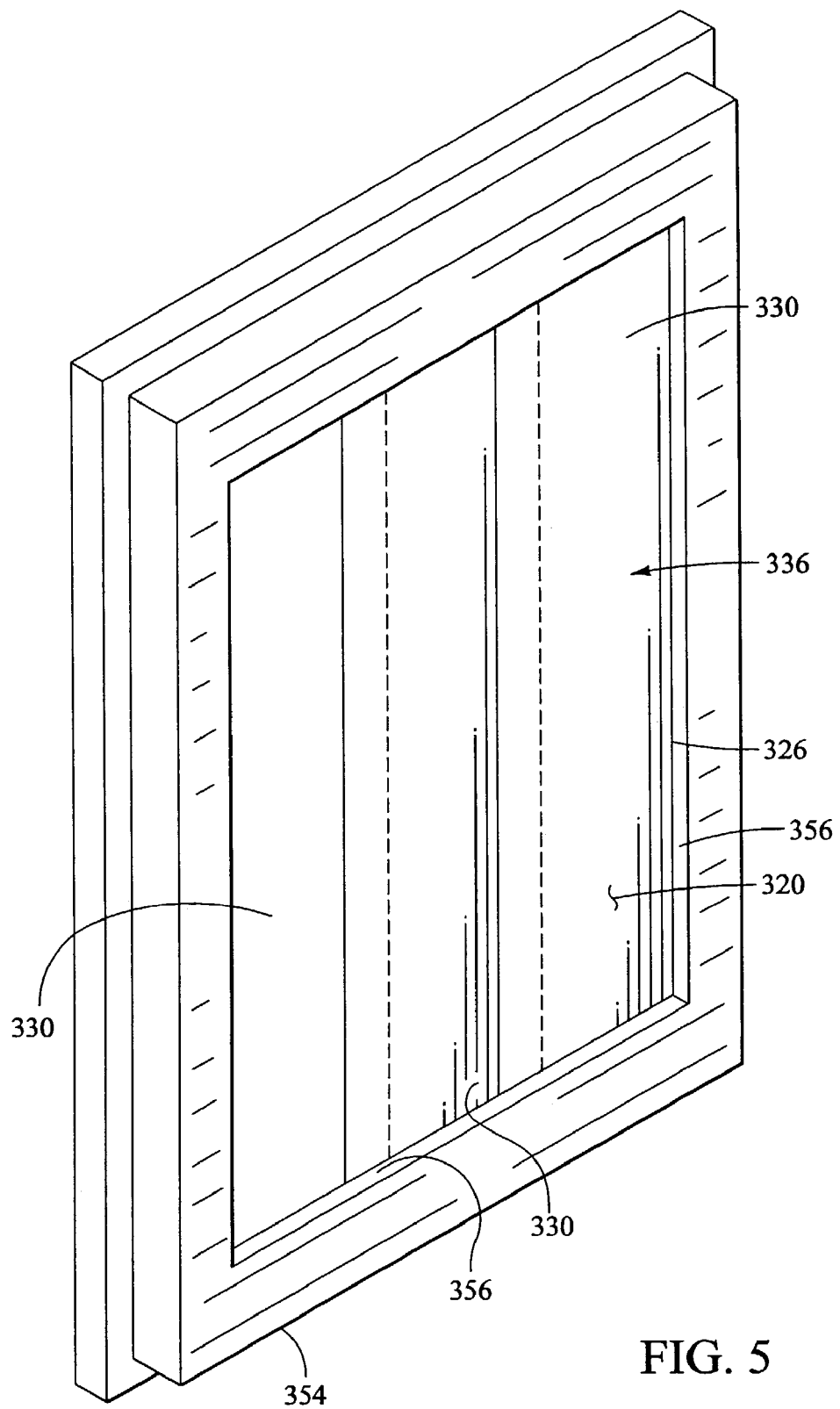
FIG. 5 is a perspective view of an additional assembly in accordance with the present invention.

FIG. 5 is a perspective view of an additional assembly in accordance with the present invention. The assembly of FIG. 5 includes a window sash 354 and the assembly of FIG. 4. In the assembly of FIG. 5, window sash 354 has been positioned over insulating glass unit 336 so that insulating glass unit 336 is fixed to window sash 354 by glue 352 of FIG. 4. In FIG. 5 it may be appreciated that window sash 354 includes a plurality of inside edges 356. Also, referring to FIG. 5, it may be appreciated that protective covering 320 generally extends to inside edges 356 of window sash 354. In other words, outer periphery 326 of protective covering 320 is generally aligned with inside edges 356 of window sash 354.

The assembly of FIG. 5 may be transported to a construction site where window sash 354 may be painted. When this is the case, protective covering 320 will mask first surface 304 of first pane 302A so that no paint is applied to this surface. When painting is complete, strips 330 of protective covering 320 may be removed from first surface 304 of first pane 302A. Protective covering 320 may also protect first surface 304 of first pane 302A during manufacture, transportation, and installation of the assembly of FIG. 5.

Figure 6:
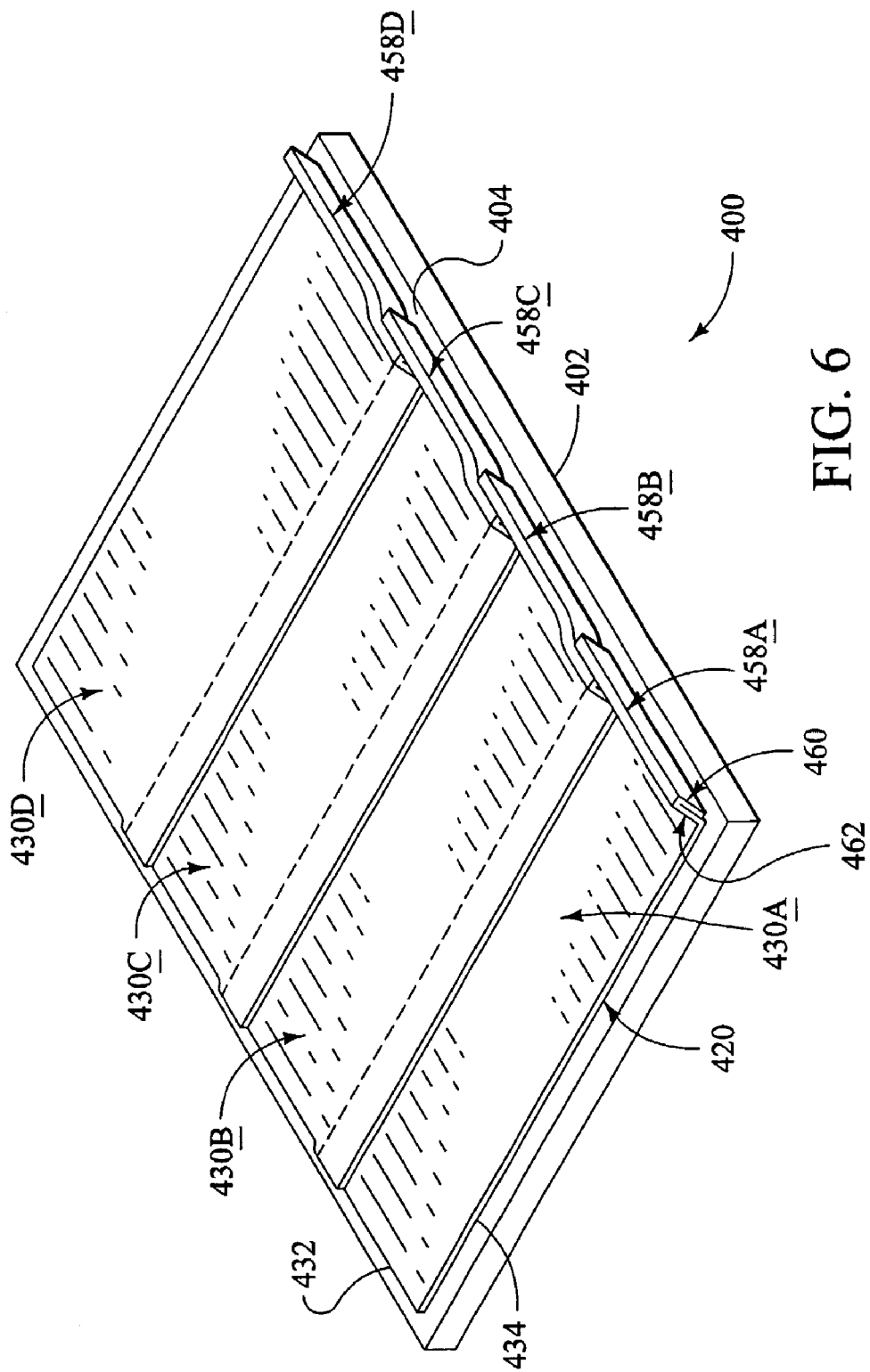
FIG. 6 is a perspective view of an assembly in accordance with an additional exemplary embodiment of the present invention.

FIG. 6 is a perspective view of an assembly 400 in accordance with an additional exemplary embodiment of the present invention. Assembly 400 includes a pane 402 having a first surface 404. A protective covering 420 is disposed across first surface 404 of pane 402. Protective covering 420 includes a first strip 430A.

First strip 430A of protective covering 420 of FIG. 6 comprises a substrate 432 and an adhesive 434 disposed over a first face of substrate 432. In FIG. 6, it may also be appreciated that first strip 430A includes a first tab 458A. In the embodiment of FIG. 6, first tab 458A comprises a first portion 460 of substrate 432 that is folded so as to overlap a second portion 462 of substrate 432 so that the adhesive 434 covering first portion 460 is adhered to the adhesive 434 covering second portion 462.

Protective covering 420 of assembly 400 also includes a second strip 430B, a third strip 430C, and a fourth strip 430D. In the embodiment of FIG. 6, second strip 430B, third strip 430C, and fourth strip 430D include a second tab 458B, a third tab 458C, and a fourth tab 458D respectively.

Figure 7:
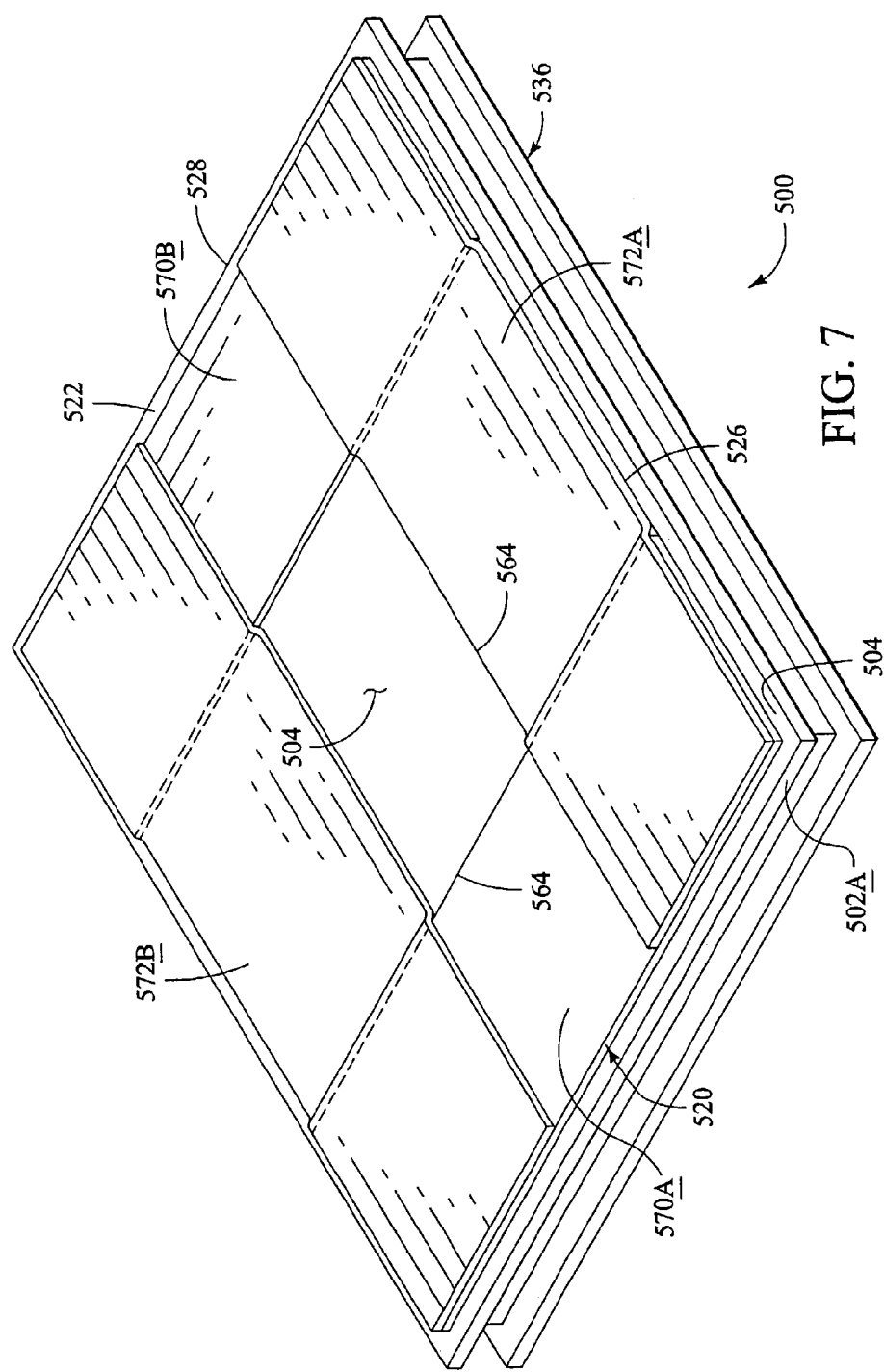
FIG. 7 is a perspective view of an assembly in accordance with still another embodiment of the present invention.

FIG. 7 is a perspective view of an assembly 500 in accordance with still another embodiment of the present invention. Assembly 500 includes a protective covering 520 disposed upon a first surface 504 of a first pane 502A of an insulating glass unit 536. In the embodiment of FIG. 7, protective covering 520 includes a first horizontal strip 570A and a second horizontal strip 570B. Protective covering 520 also includes a first verical strip 572A and a second verical strip 572B. In FIG. 7, it may be appreciated that first verical strip 572A, second verical strip 572B, first horizontal strip 570A, and second horizontal strip 570B define a generally rectangular outer periphery 526 of protective covering 520. In FIG. 7 it may also be appreciated that protective covering 520 has an inner periphery 564.

First surface 504 of first pane 502A includes an unmasked apron portion extending between outer periphery 526 of protective covering 520 and an outer periphery 528 of first pane 502A. In one method in accordance with the present invention, a window sash may be adhered to unmasked portion 522 of first surface 504 of first pane 502A. In an advantageous embodiment, outer periphery 526 of protective covering 520 may be sized to protect a portion of first surface 504 of first pane 502A proximate the window sash while the window sash is being painted.

Figure 8:
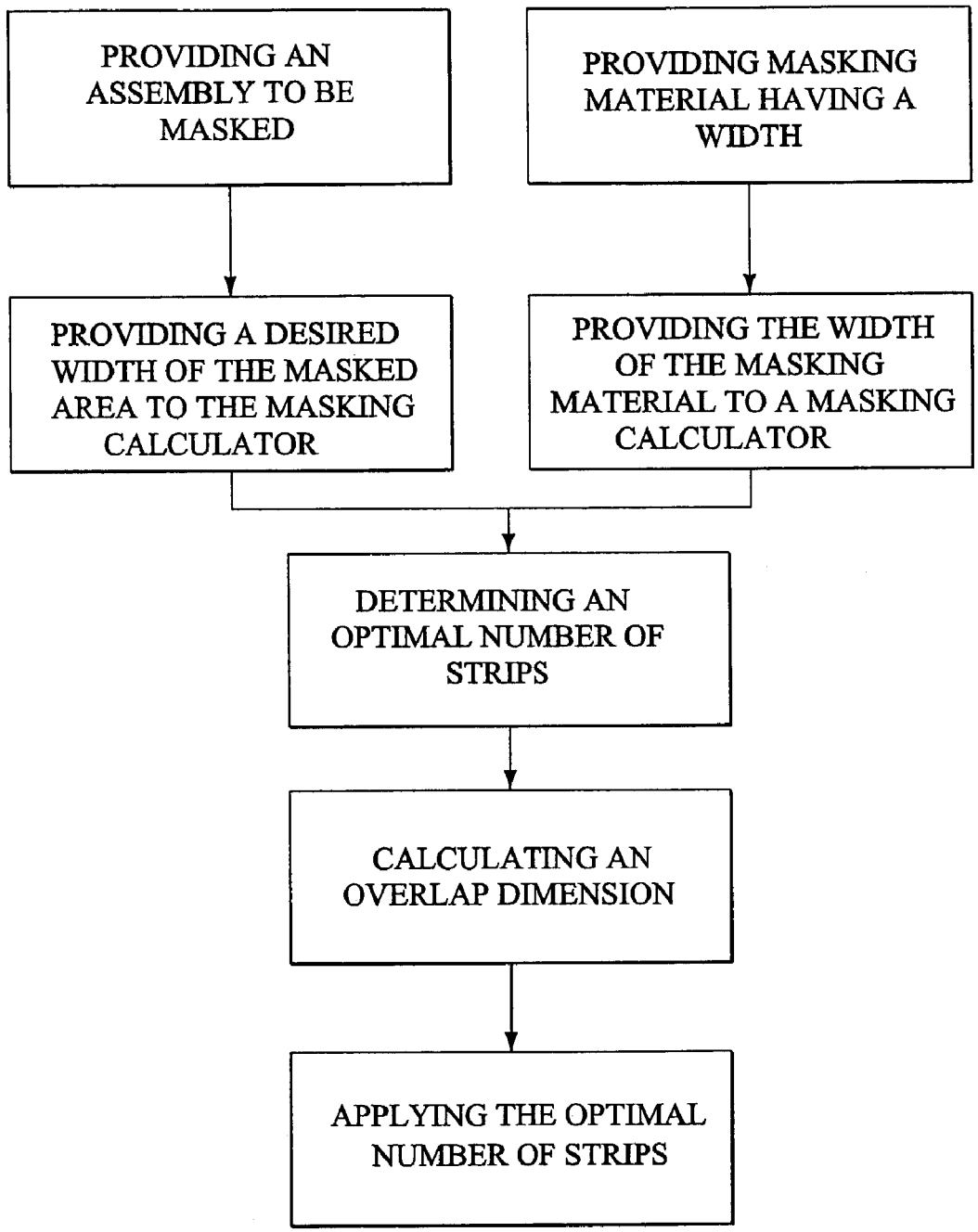
FIG. 8 is a flow chart illustrating an exemplary method in accordance with the present invention.

FIG. 8 is a flow chart illustrating an exemplary method in accordance with the present invention. The method of FIG. 8 includes a step of providing an assembly to be masked. For example, this step may include the step of providing an insulating glass unit including a first pane having a first surface. The method of FIG. 8 also includes the step of providing a desired width of the masked area to a masking calculator. For example, an insulating glass unit may move into a masking station. In the masking station, a dimension of the insulating glass unit may be detected. A controller associated with the masking station may utilize the detected dimension to determine a masked area corresponding to an insulating glass unit having that dimension.

The method of FIG. 8 also includes the step of providing masking material having a width. In a preferred method, the width of the masking material may be selected to correspond with the width of a masked area of a small insulating glass unit. In this preferred method, a small insulating glass unit may be masked by applying a single strip of masking material to a surface of the small insulating glass unit. Insulating glass units having a dimension larger than the small insulating glass unit may be masked using multiple strips of masking material.

The method of FIG. 8 also includes the step of determining an optimal number of strips. As described above, for a small insulating glass unit, the optimal number of strips may be one. For other insulating glass units, multiple strips may be desired. The method of FIG. 8 also includes the step of calculating an overlap dimension. The width of the masking material and the optimal number of strips may be used to calculate a desired overlap dimension to achieve coverage of the masked area.

The method FIG. 8 also includes the step of applying the optimal number of strips. For example, the optimal number of strips of masking material may be applied to a first surface of a first pane of an insulating glass unit. In one method in accordance with the present invention, the strips are applied in a sequential fashion with each subsequent strip partially overlapping the preceding strip by the calculated overlapped dimension.

Figure 9:
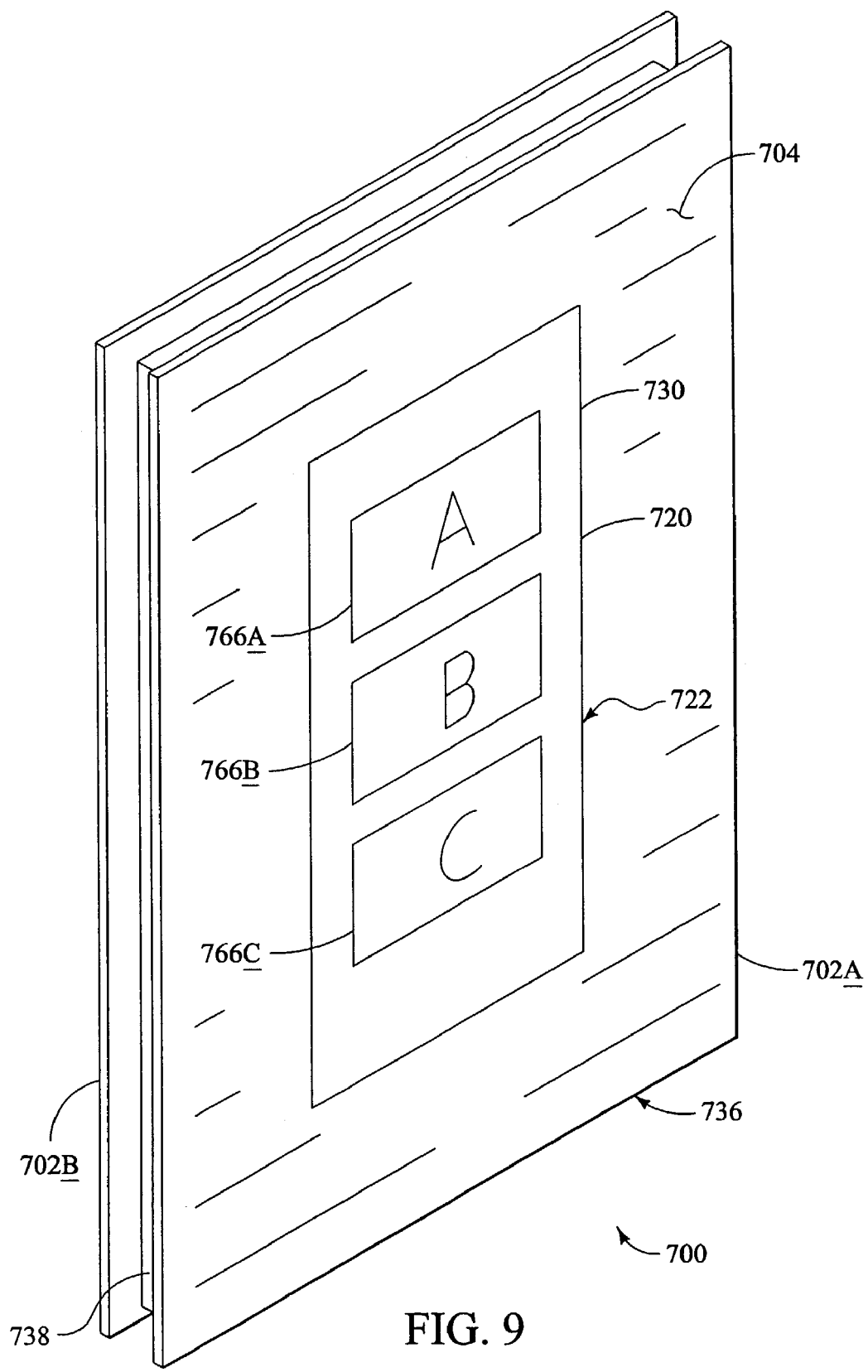
FIG. 9 is a perspective view of an assembly in accordance with an exemplary embodiment of the present invention.

FIG. 9 is a perspective of an assembly 700 in accordance with an exemplary embodiment of the present invention. Assembly 700 includes an insulating glass unit 736 having a first pane 702A. A protective covering 720 is disposed over a masked portion 722 of a first surface 704 of first pane 702A. In the embodiment of FIG. 9, protective covering 720 comprises a single strip 730. Insulating glass unit 736 of assembly 700 includes a second pane 702B and a spacer 738.

In the embodiment of FIG. 9, a first label 766A, a second label 766B, and a third label 766C are disposed over protective covering 720. In the embodiment of FIG. 9, each label preferably comprises a sheetstock and a second adhesive overlaying a first face of the sheetstock. In FIG. 9, indicia may be seen disposed on a second face of the sheetstock of each label.

Figure 10:
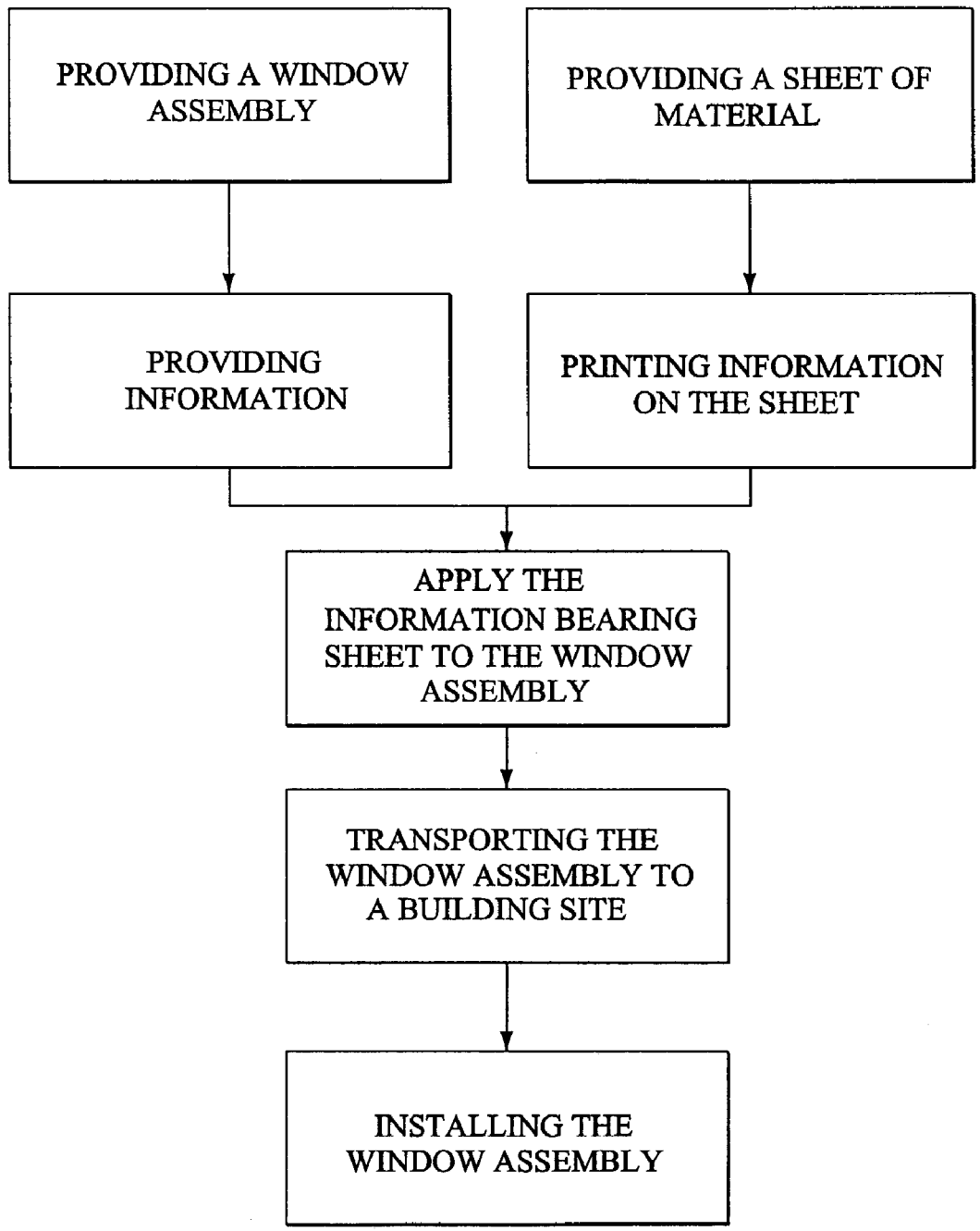
FIG. 10 is a flow chart illustrating an additional exemplary method in accordance with the present invention.

FIG. 10 is a flow chart illustrating an additional exemplary method in accordance with the present invention. The method of FIG. 10 includes the steps of providing a window assembly and providing information related to the window assembly. The window assembly may, for example, move into a labeling station. In the labeling station, an identifying characteristic of the window assembly may be detected. A controller associated with the labeling station may utilize the detected identifier to determine desirable information associated with the window assembly. The controller may then provide the desired information to a printer.

The method of FIG. 10 also includes the steps of providing a sheet of material and printing information on the sheet. The sheet of material may comprise, for example, a sheet of paper. In some methods, the sheet of material may be a standard size of paper (e.g., 11 inches by 17 inches). The method of FIG. 10 also includes the step of printing information on the sheet. In one method in accordance with the present invention, the sheet may be printed on the fly as part of a manufacturing process for window assemblies. When this is the case, the resulting information bearing sheet may include information associated with a particular window assembly. For example, the information printed on the sheet may include advertisements that are likely to be of interest to a purchaser a particular window assembly. By way of a second example, the information printed on the sheet may include ratings, such as NFRC ratings which are associated with a particular window assembly.

The step of printing information on the sheet may comprise various printing methods. Examples of printing methods which may be suitable in some applications include color electrophographic printing, color electrostatic printing, color laser printing, color ink jet printing, and color bubble jet printing.

The method of FIG. 10 also includes the step of applying the information bearing sheet to the window assembly. The information bearing sheet may be applied, for example, directly to a surface of a pane of the window assembly. In other methods in accordance with the present invention, the information bearing sheet may be applied with a protective covering interposed between the information bearing sheet and a pane of the window assembly.

It is to be appreciated, that various embodiments of a window assembly may be used without deviating from the spirit and scope of the present invention. A window assembly may comprise, for example, a single pane, and/or an insulating glass unit, and/or a window sash. In FIG. 10, it may be appreciated that the present exemplary method includes the step of transporting the window assembly to a building site. The method of FIG. 10 also includes the step of installing the window assembly. The step of installing the window the window assembly may include the step of attaching the window assembly to a building. As described above, the information bearing sheet may include advertisements that are likely to be of interest to persons present in the building. Persons likely to be present in the building may include new home owners, carpenters, business owners, and prospective window purchasers. The information bearing sheet may also include additional information, for example installation instructions associated with the window assembly.

Figure 11:
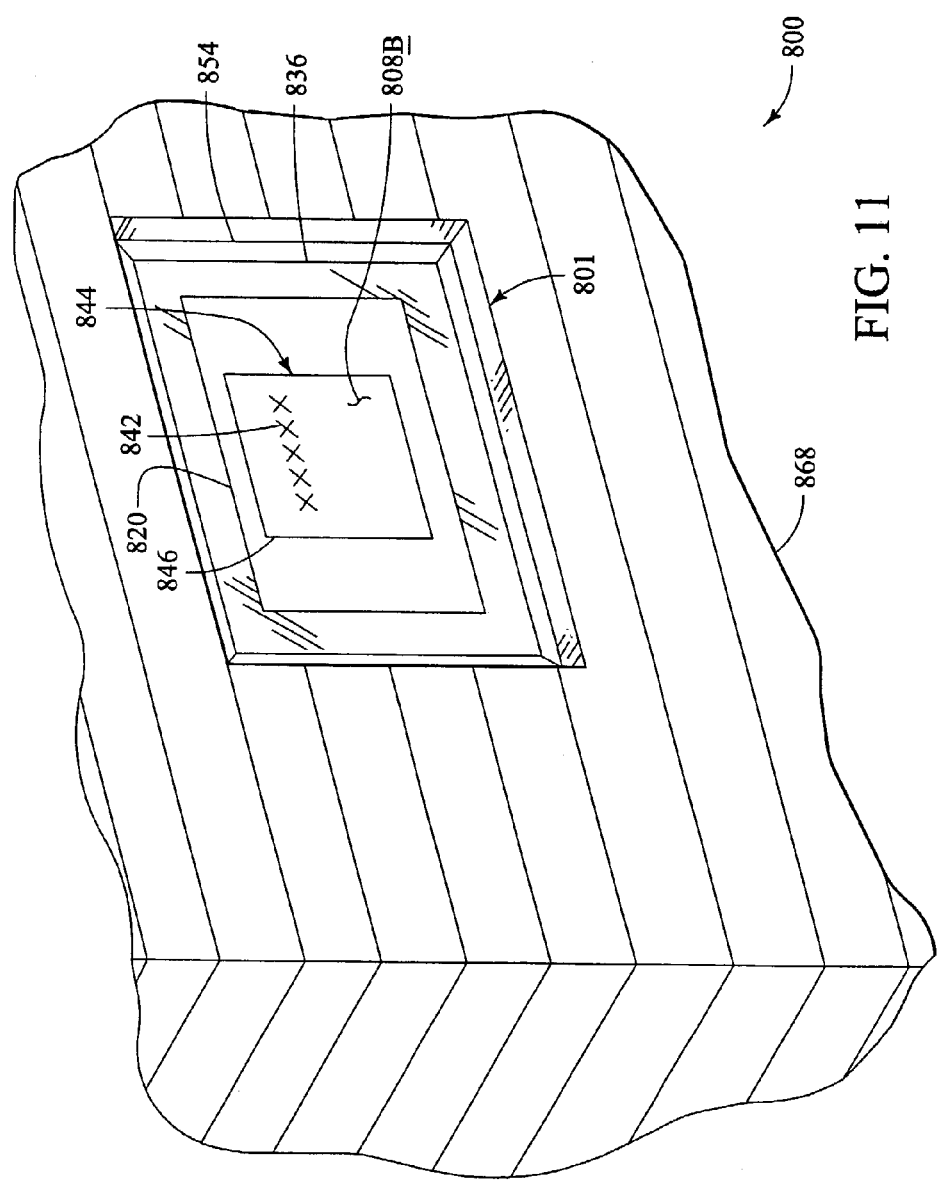
FIG. 11 is a perspective view of an assembly in accordance with an exemplary embodiment of the present invention.

FIG. 11 is a perspective view of an assembly 800 in accordance with an exemplary embodiment of the present invention. Assembly 800 includes a window assembly 801 that has been installed in a building 868. Window assembly 801 comprises an insulating glass unit 836 and a window sash 854. An information bearing sheet 844 is attached to insulating glass unit 836. In the embodiment of FIG. 11, a protective covering 820 interposed between information bearing sheet 844 and insulating glass unit 836. Embodiments are also possible in which information bearing sheet 844 is attached directly to insulating glass unit 836.

In the embodiment of FIG. 11, information bearing sheet 844 is disposed generally outside of building 868. Information bearing sheet 844 comprises sheetstock having a first surface and a second surface. In FIG. 11, it may be appreciated that a second indicia 842 is disposed on second surface 808B of sheetstock 846. Second indicia 842 is preferably visible to a viewer located outside of building 868. Information bearing sheet 844 also preferably includes a first indicia printed on the first surface of sheetstock 846 of information bearing sheet 844. In a preferred embodiment, the first indicia is visible to a viewer located generally inside of building 868.

Figure 12:
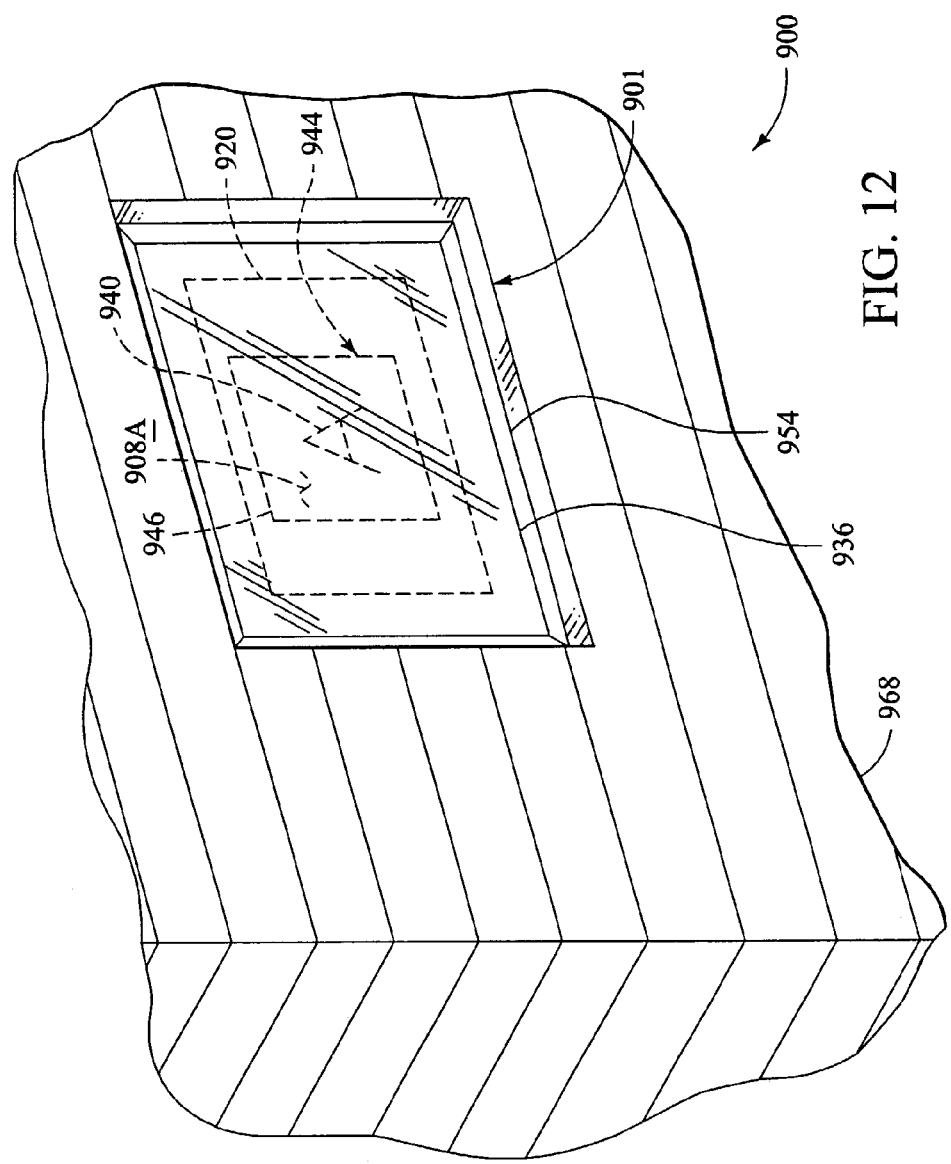
FIG. 12 is a perspective view of an assembly in accordance with an exemplary embodiment of the present invention.

FIG. 12 is a perspective view of an assembly 900 in accordance with an exemplary embodiment of the present invention. Assembly 900 includes a window assembly 901 that has been installed in a building 968. Window assembly 901 comprises an insulating glass unit 936 and a window sash 954. An information bearing sheet 944 is attached to insulating glass unit 936. In the embodiment of FIG. 12, a protective covering 920 interposed between information bearing sheet 944 and insulating glass unit 936. Embodiments are also possible in which information bearing sheet 944 is attached directly to insulating glass unit 936. In the embodiment of FIG. 12, information bearing sheet 944 is disposed generally inside of building 968. Information bearing sheet 944 comprises sheetstock having a first surface and a second surface.

In FIG. 12, it may be appreciated that a first indicia 940 is disposed on first surface 908A of sheetstock 946. First indicia 940 is preferably visible to a viewer located outside of building 968. Information bearing sheet 944 also preferably includes a second indicia printed on the second surface of sheetstock 946 of information bearing sheet 944. In a preferred embodiment, the second indicia is visible to a viewer located generally inside of building 968.

Figure 13:
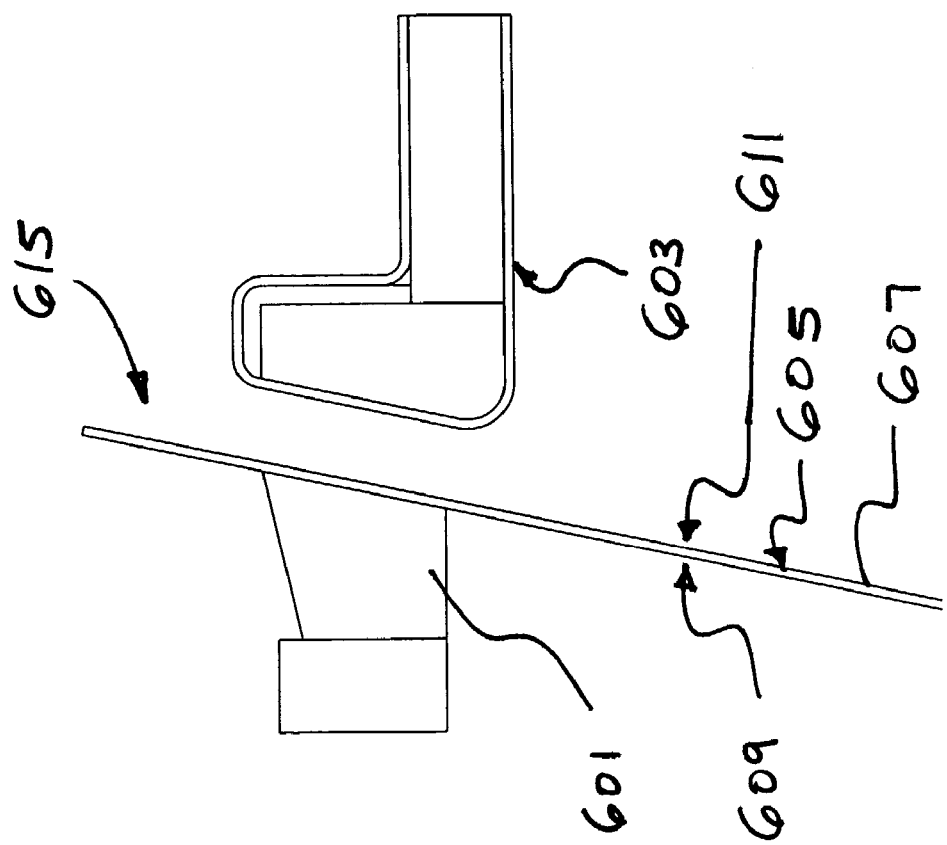
FIG. 13 is a diagrammatic top view useful for describing methods and apparatus in accordance with the present invention.

FIG. 13 is a diagrammatic top view useful for describing methods and apparatus in accordance with the present invention. A first tool 601 and a second tool 603 are shown in FIG. 13. A length of masking material 605 is disposed between first tool 601 and second tool 603. Masking material 605 comprises a substrate 607 and an adhesive overlaying one side of substrate 607. Accordingly, masking material 605 has an adhesive side 609 and a non-adhesive side 611. In the embodiment of FIG. 13, a gap is shown between first tool 601 and second tool 603 and adhesive side 609 of masking material 605 is adhered to first tool 601. In FIG. 13, it will be appreciated that a tail 615 of masking material 605 extends beyond first tool 601.

Figure 14:
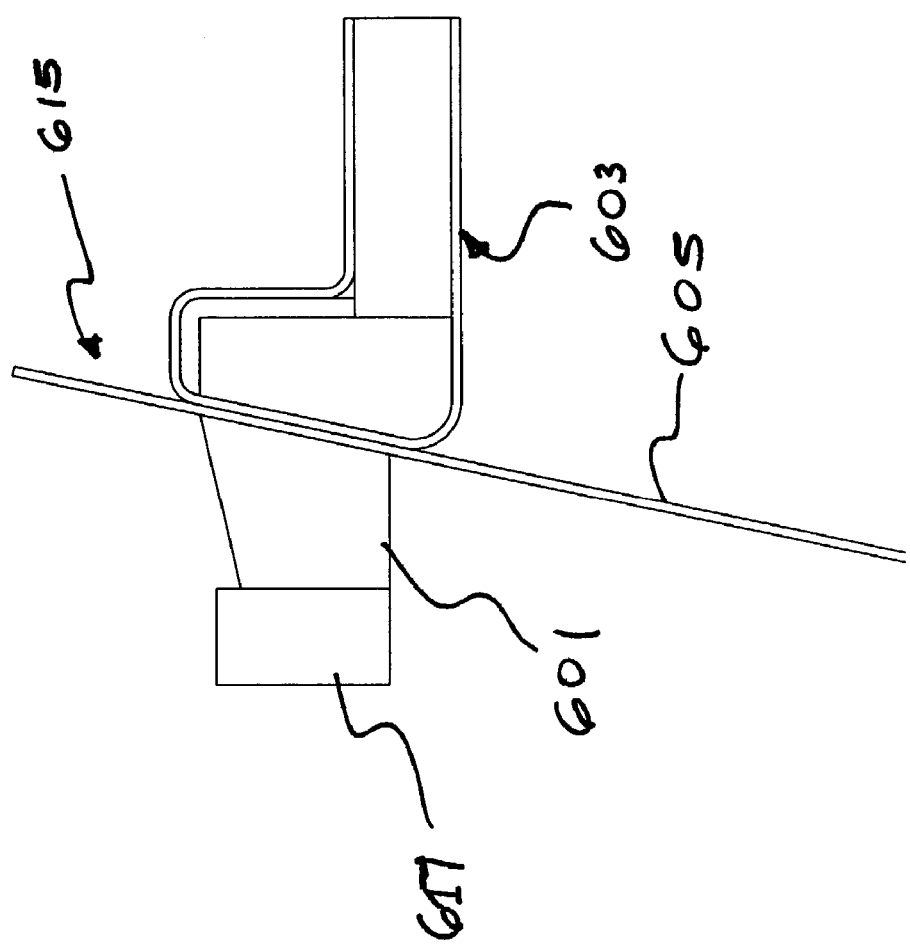
FIG. 14 is an additional diagrammatic top view for describing methods and apparatus in accordance with the present invention.

FIG. 14 is an additional diagrammatic top view for explaining methods and apparatus in accordance with the present invention. In the embodiment of FIG. 14, masking material 605 has been trapped between first tool 601 and second tool 603. In the embodiment of FIG. 14, an air knife 617 is fixed to first tool 601. In some methods in accordance with the present invention, air knife 617 is used to produce an air flow that impinges on tail 615 of masking material 605. Air knives which may be suitable in some applications are commercially available from Exair Corporation of Cincinnati, Ohio.

Figure 15:
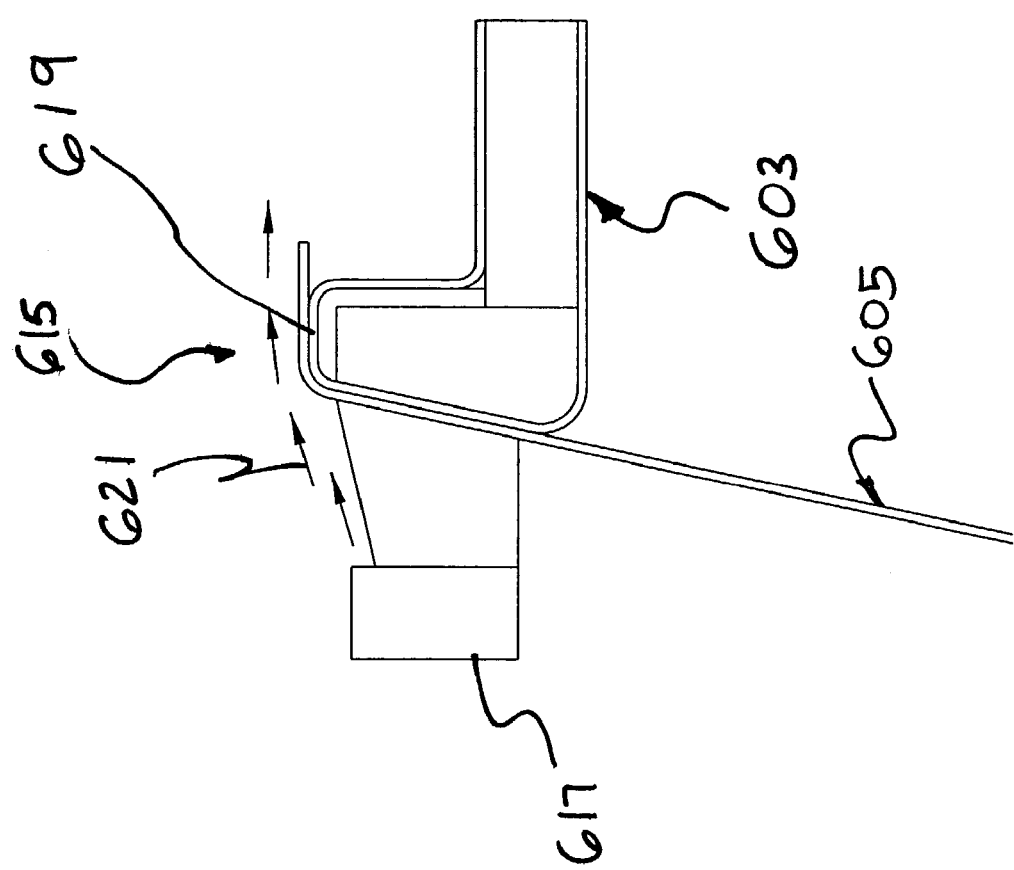
FIG. 15 is another diagrammatic top view useful for describing methods and apparatus in accordance with the present invention.

FIG. 15 is another diagrammatic top view useful for describing methods and apparatus in accordance with the present invention. In FIG. 15, it may be appreciated that tail 615 of masking material 605 is disposed across a face 619 of second tool 603. In FIG. 15, an air stream 621 is illustrated using a plurality of arrows. In the embodiment of FIG. 15, air stream 621 is shown urging tail 615 to lay across face 619 of second tool 603. Air stream 621 may be produced, for example, by placing an air source in fluid communication with air knife 617.

Figure 16:
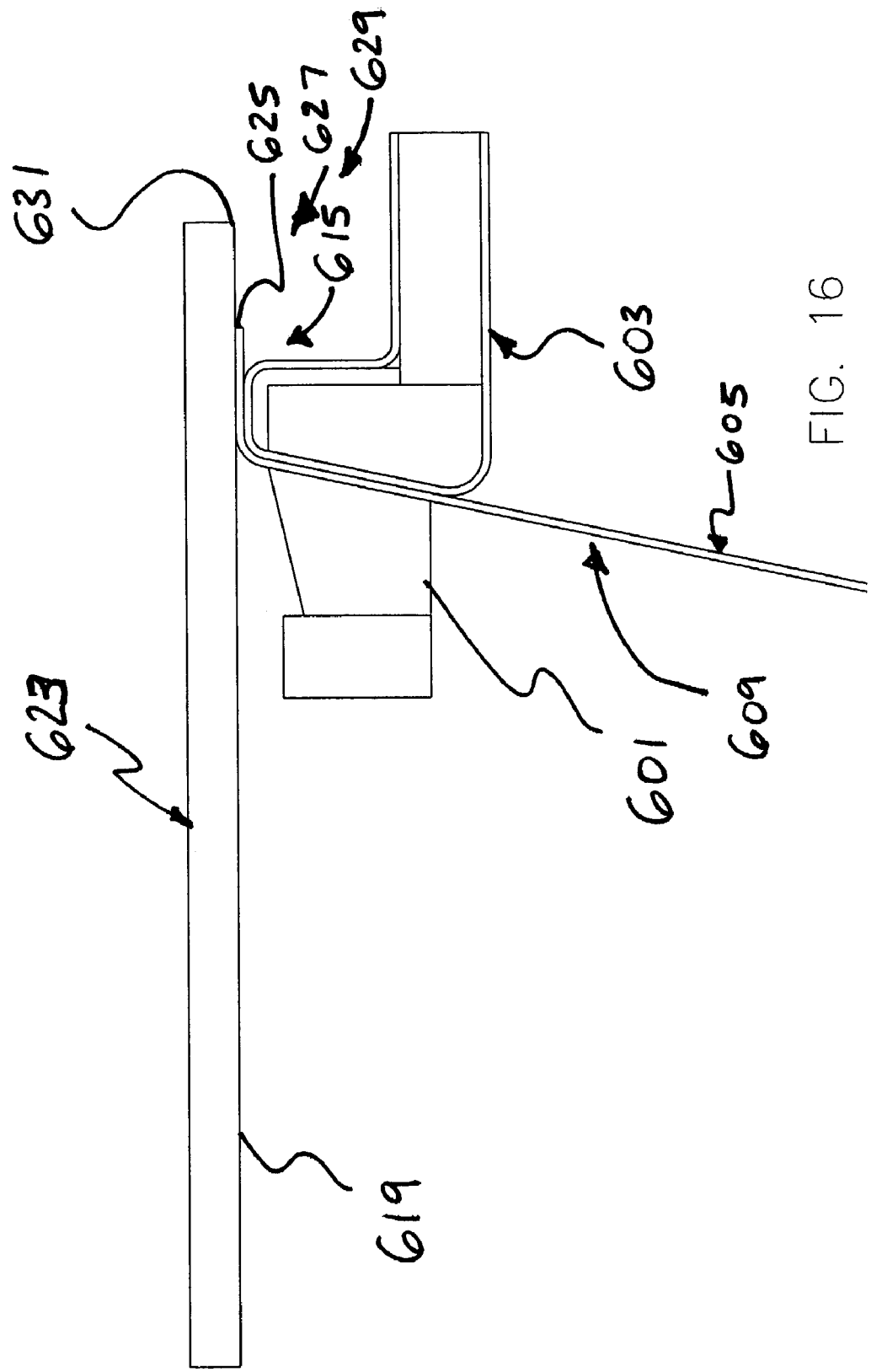
FIG. 16 is yet another diagrammatic top view useful for describing methods and apparatus in accordance with the present invention.

FIG. 16 is yet another diagrammatic top view useful for describing methods and apparatus in accordance with the present invention. In FIG. 16, first tool 601 and second tool 603 have been moved to a location proximate workpiece 623. In FIG. 16, it may be appreciated that tail 615 of masking material 605 is trapped between second tool 603 and workpiece 623. In FIG. 16, it may be appreciated that a first end 625 of masking material 605 has been positioned so that a first portion 627 of an unmasked apron 629 of workpiece 623 will extend between first end 625 of masking material 605 and an outer periphery 631 of workpiece 623. In the embodiment of FIG. 16, adhesive side 609 of masking material 605 is shown contacting a surface 619 of workpiece 623.

Figure 17:
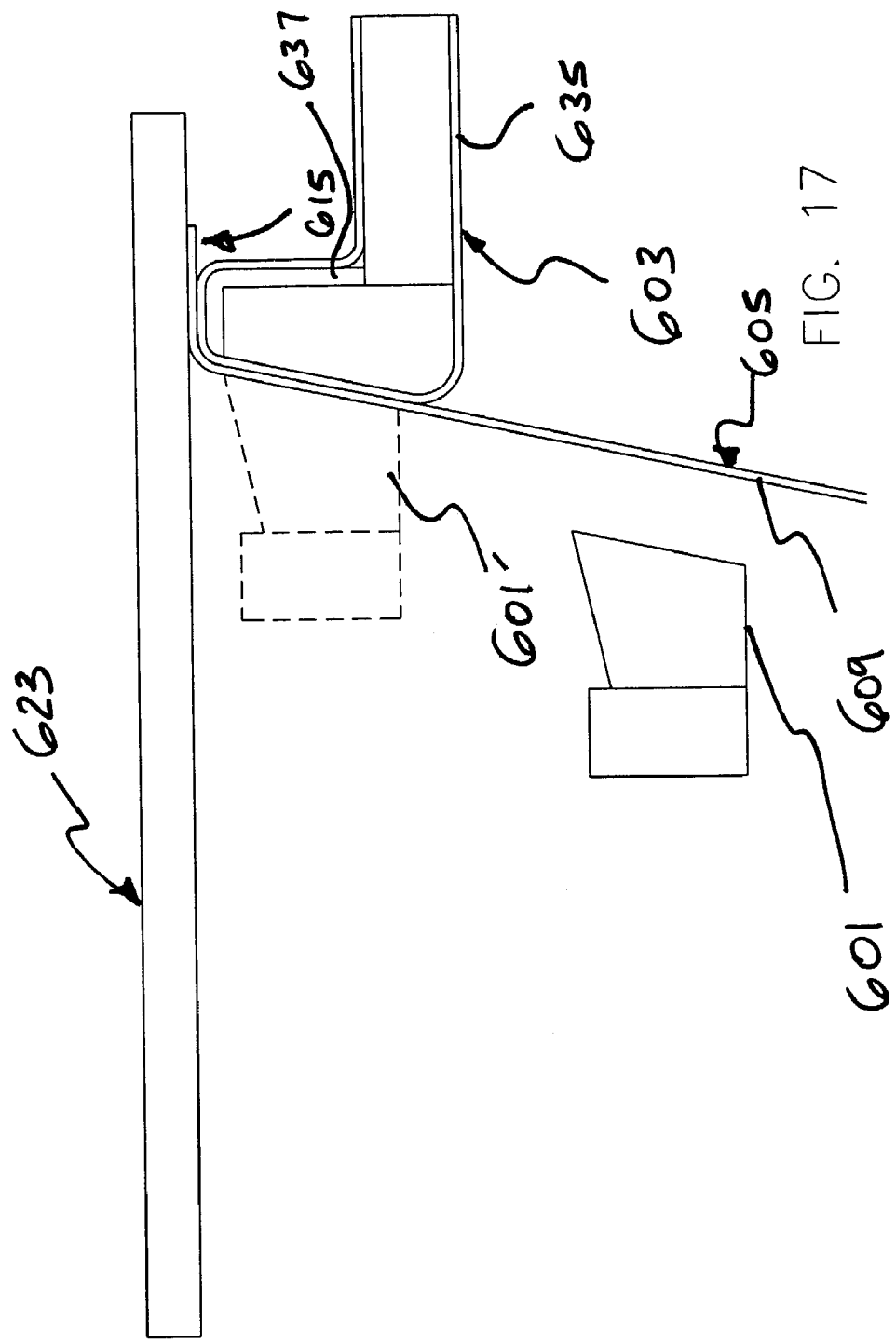
FIG. 17 is still another diagrammatic top view useful for describing methods and apparatus in accordance with the present invention.

FIG. 17 is still another diagrammatic top view useful for describing methods and apparatus in accordance with the present invention. In the embodiment of FIG. 17, first tool 601 has been moved away from second tool 603 and adhesive side 609 of masking material 605. A previous position 601' of first tool 601 is represented with dashed lines in FIG. 17. Previous position 601' generally corresponds to the position shown in the previous figure. In the embodiment of FIG. 17, tail 615 of masking material 605 is trapped between second tool 603 and workpiece 623. In the embodiment of FIG. 17, second tool 603 includes a low friction skin 635 and a resilient pad 637. Resilient pad 637 may comprise, for example, closed cell foam. Low friction skin 635 may comprise for example, a coated fabric.

Figure 18:
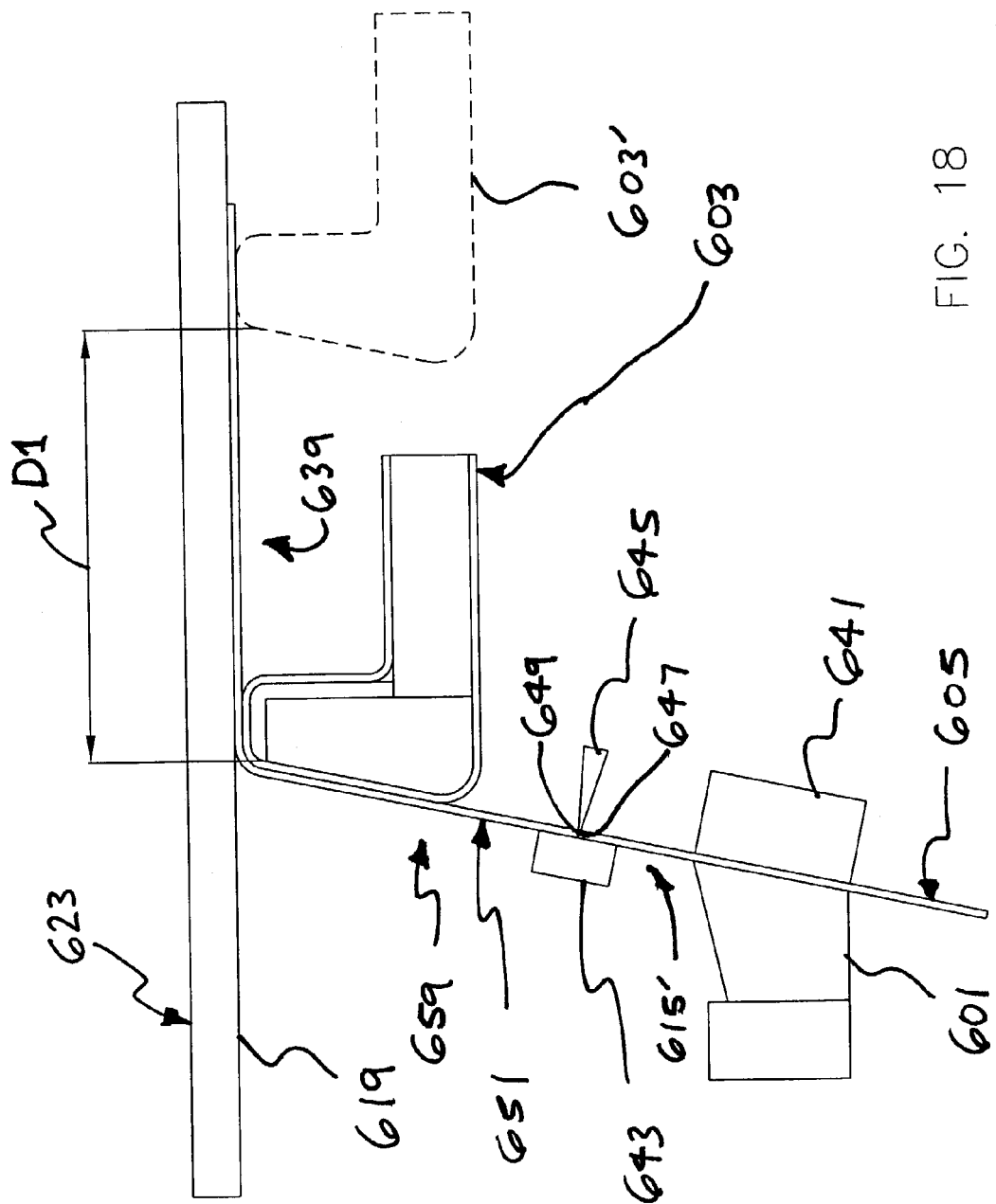
FIG. 18 is a diagrammatic top view useful for describing methods and apparatus in accordance with the present invention.

FIG. 18 is still another diagrammatic top view useful for describing methods and apparatus in accordance with the present invention. In FIG. 18, a previous position 603' of second tool 603 is shown with dashed lines. Previous position 603' generally corresponds to the position shown in the previous figure. In FIG. 18, it may be appreciated that second tool 603 has been moved by a first distance D1. Also in FIG. 18, it may be appreciated that a first section 639 of masking material 605 has been applied to surface 619 of workpiece 623. A third tool 641 has been moved into position so that masking material 605 is trapped between first tool 601 and third tool 641. Also in the embodiment of FIG. 18, a cutter 645 and a cutting board 643 have been moved into position to form a cut 647 in masking material 605. Cut 647 defines a second end 649 of a first strip 651. In FIG. 18, it may be appreciated that cut 647 has been formed in a section of masking material 605 that is not adhered to workpiece 623. In FIG. 18, a first section 639 of first strip 651 is shown contacting workpiece 623 and a second section 659 of first strip 651 is shown extending away from workpiece 623. In FIG. 18, a second tail 615 of masking material 605 is shown extending beyond first tool 601 and third tool 641.

Figure 19:
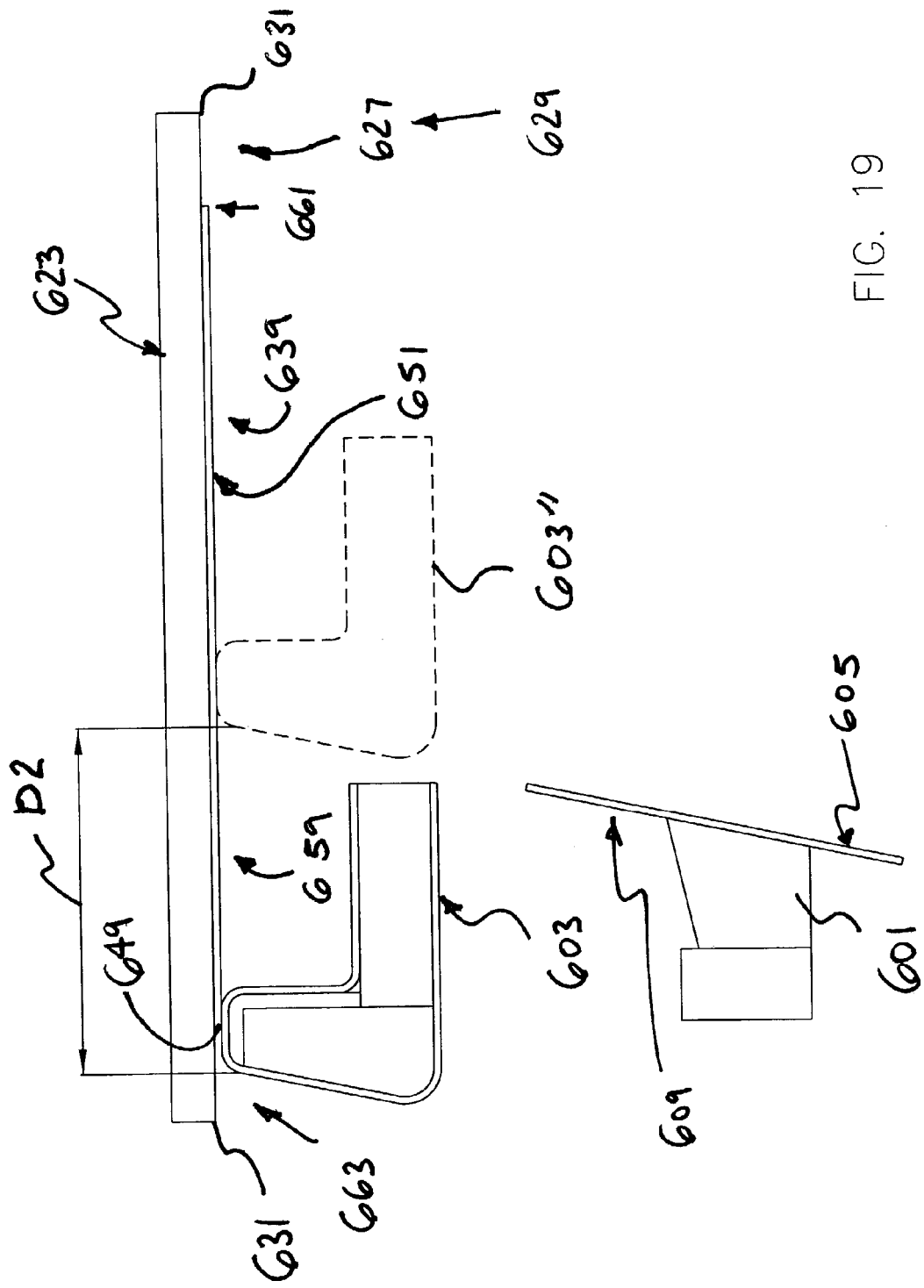
FIG. 19 is an additional diagrammatic top view useful for describing methods and apparatus in accordance with the present invention.

FIG. 19 is an additional diagrammatic top view useful for describing methods and apparatus in accordance with the present invention. In FIG. 19, a previous position 603" of second tool 603 is shown with dashed lines. Previous position 603" generally corresponds to the position shown in the previous figure. In FIG. 19, it may be appreciated that second tool 603 has been moved by a second distance D2. In FIG. 19, first section 639 and second section 659 of first strip 651 are both shown contacting workpiece 623. Also in FIG. 19, it may be appreciated that third tool 641 has been withdrawn from first tool 601 leaving adhesive side 609 of masking material 605 adhered to first tool 601 with a tail of masking material 605 extending beyond first tool 601. In FIG. 19, it may be appreciated that a first end 661 of first strip 651 is positioned so that a first portion 627 of an unmasked apron 629 of workpiece 623 extends between first end 661 of first strip 651 and an outer periphery 631 of workpiece 623. In FIG. 19, it may be also be appreciated that the length of first strip 651 has been selected so that a second portion 663 of unmasked apron 629 of workpiece 623 extends between a second end 649 of first strip 651 and an outer periphery 631 of workpiece 623.

Figure 20:
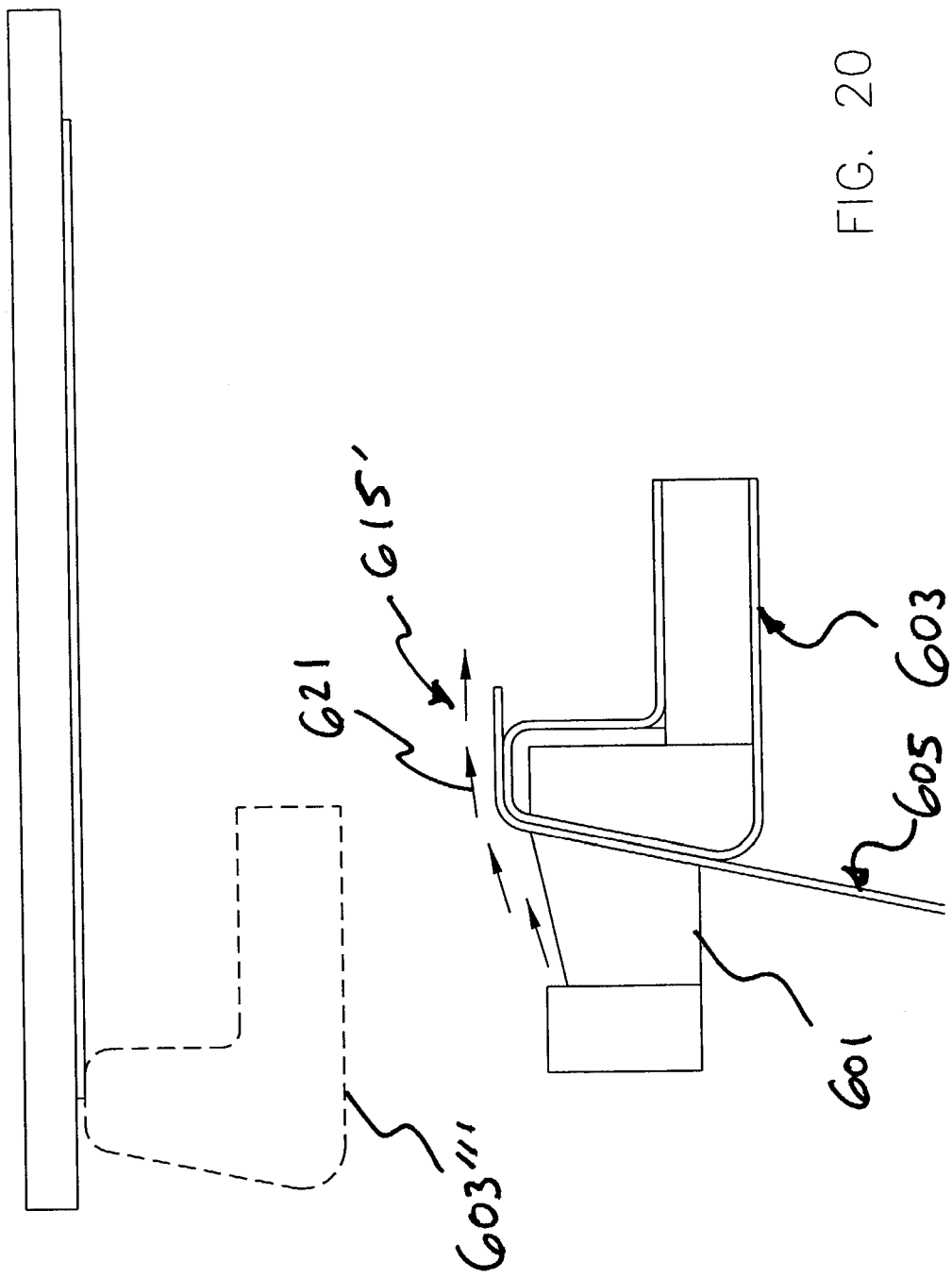
FIG. 20 is a diagrammatic top view useful for describing methods and apparatus in accordance with the present invention.

FIG. 20 is an additional diagrammatic top view useful for describing methods and apparatus in accordance with the present invention. In FIG. 20, a previous position 603''' of second tool 603 is shown with dashed lines. Previous position 603''' generally corresponds to the position shown in the previous figure. In FIG. 20, it may be appreciated that second tool 603 has been moved into position so that masking material 605 is trapped between first tool 601 and second tool 603. Also in the embodiment of FIG. 20 it may be appreciated that an air stream 621 has been directed to impinge upon second tail 615' of masking material 605. As a result, second tail 615' is disposed across face 619 of second tool 603. Second tail 615' may be trapped between second tool 603 and a new workpiece by moving second tool 603 proximate the new workpiece.

Figure 21:
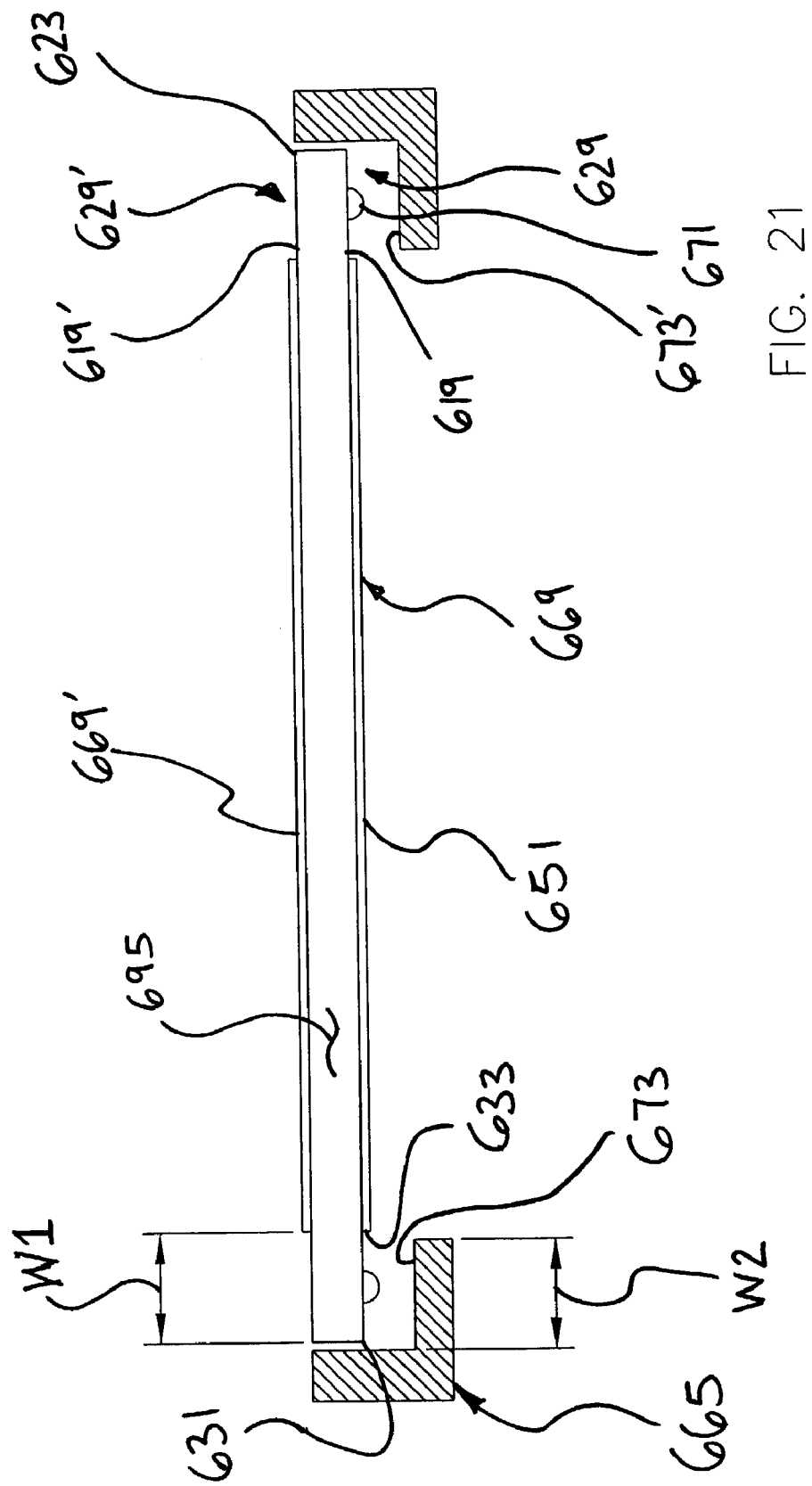
FIG. 21 is a diagrammatic top view of an assembly in accordance with the present invention.

FIG. 21 is a diagrammatic top view of an assembly in accordance with an exemplary embodiment of the present invention. The assembly of FIG. 21 includes a workpiece 623 and a first sash piece 665. In the exemplary embodiment of FIG. 21, workpiece 623 comprises an insulating glass unit 695. In FIG. 21, it may be appreciated that a first protective covering 669 comprising a first strip 651 is disposed on a first surface 619 of workpiece 623 and a second protective covering 669' is disposed on a second surface 619' of workpiece 623. In the embodiment of FIG. 21, a first unmasked apron 629 of first surface 619 extends between an outer periphery 633 of first protective covering 669 and an outer periphery 631 of workpiece 623. Similarly, a second unmasked apron 629' of second surface 619' extends between an outer periphery 633 of second protective covering 669' and an outer periphery 631 of workpiece 623. In the embodiment of FIG. 21, first unmasked apron 629 and second unmasked apron 629' both have a width W1. In the embodiment of FIG. 21, an adhesive material 671 has been deposited on first unmasked apron 629 of first surface 619.

A first mating portion 673 and a second mating portion 673' of first sash piece 665 are shown in FIG. 21. In the embodiment of FIG. 21, first mating portion 673 and second mating portion 673' both have a width W2. In the exemplary embodiment of FIG. 21, width W2 of first mating portion 673 is generally equal to width W1 of first unmasked apron 629. In some useful embodiments of the present invention, the width of first an unmasked apron is generally greater than the width of a mating portion of a sash piece.

Figure 22:
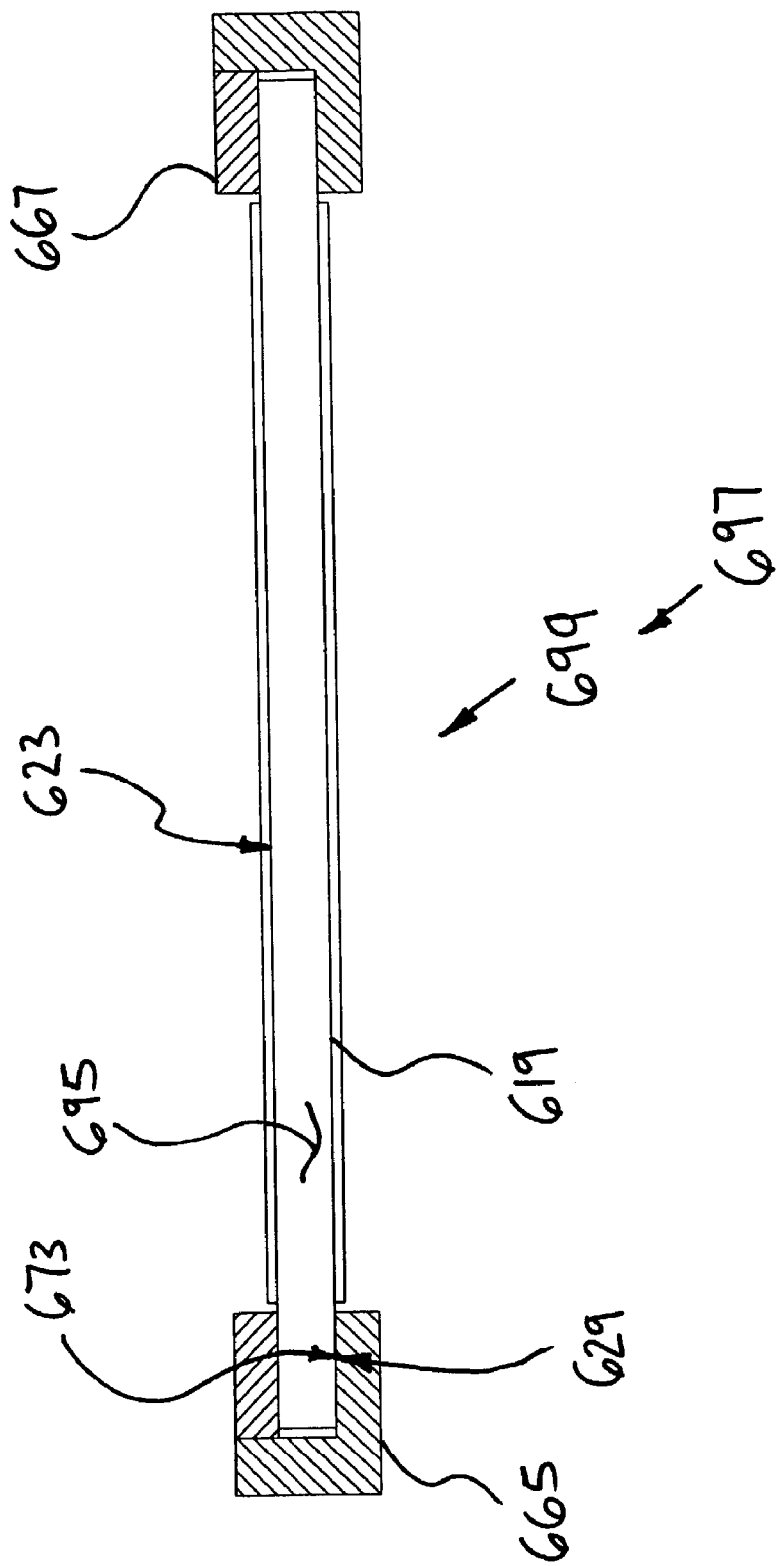
FIG. 22 is a diagrammatic top view of a window in accordance with the present invention.

FIG. 22 is a diagrammatic top view of a window 697 comprising including insulating glass unit 695 and first sash piece 665 shown in the previous figure. In FIG. 22 it may be appreciated that first unmasked apron 629 been mated with first mating portion 673 and second mating portion 673' of first sash piece 665. Workpiece 623 may be fixed to first sash piece 665, for example, using an adhesive material. A second sash piece 667 is also shown in FIG. 22. Window 697 has a view area 699 that is not covered by first sash piece 665.

Figure 23:
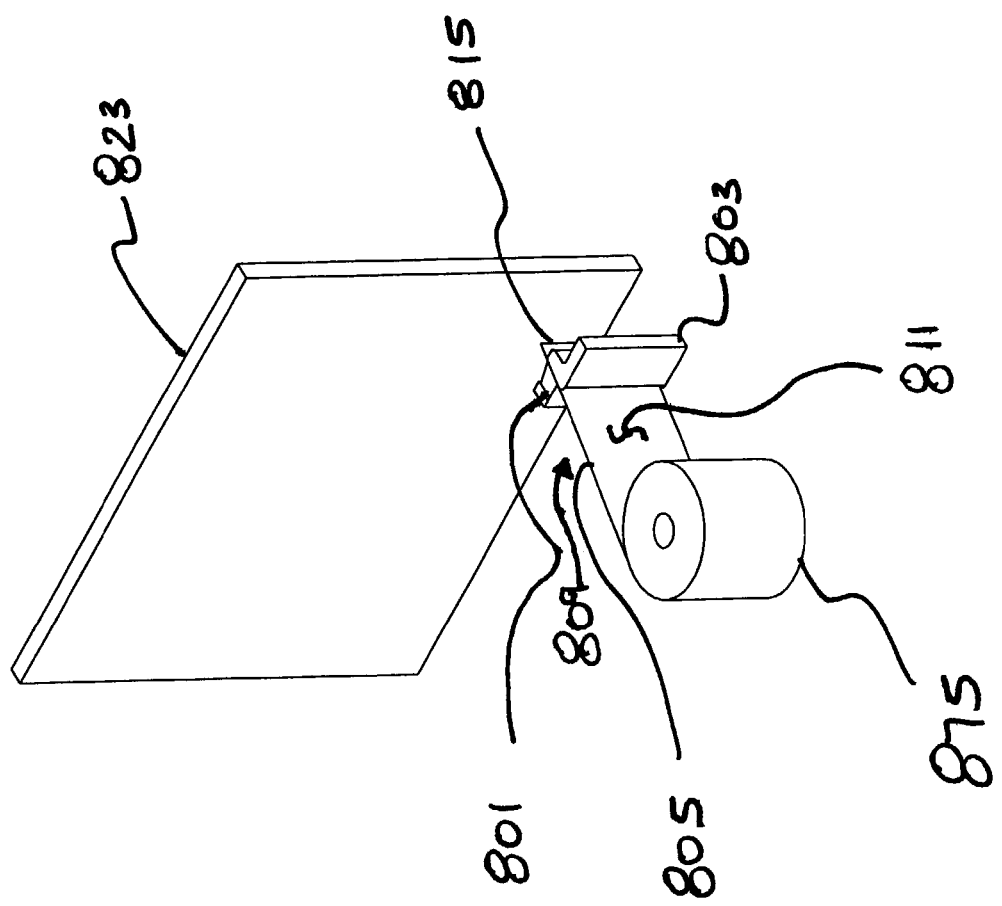
FIG. 23 is an isometric view useful for describing methods and apparatus in accordance with the present invention.

FIG. 23 is an isometric view useful for describing methods and apparatus in accordance with the present invention. A first tool 801, a second tool 803, and a roll 875 of masking material 805 are all shown in FIG. 23. In the embodiment of FIG. 23, a section of masking material 805 is trapped between first tool 801 and second tool 803. In FIG. 23, it will be appreciated that a tail 815 of masking material 805 extends beyond first tool 801 and second tool 803. Masking material 805 comprises a substrate 807 and an adhesive overlaying one side of substrate 807. Accordingly, masking material 805 has an adhesive side 809 and a non-adhesive side 811. A workpiece 823 is also shown in FIG. 23.

Figure 24:
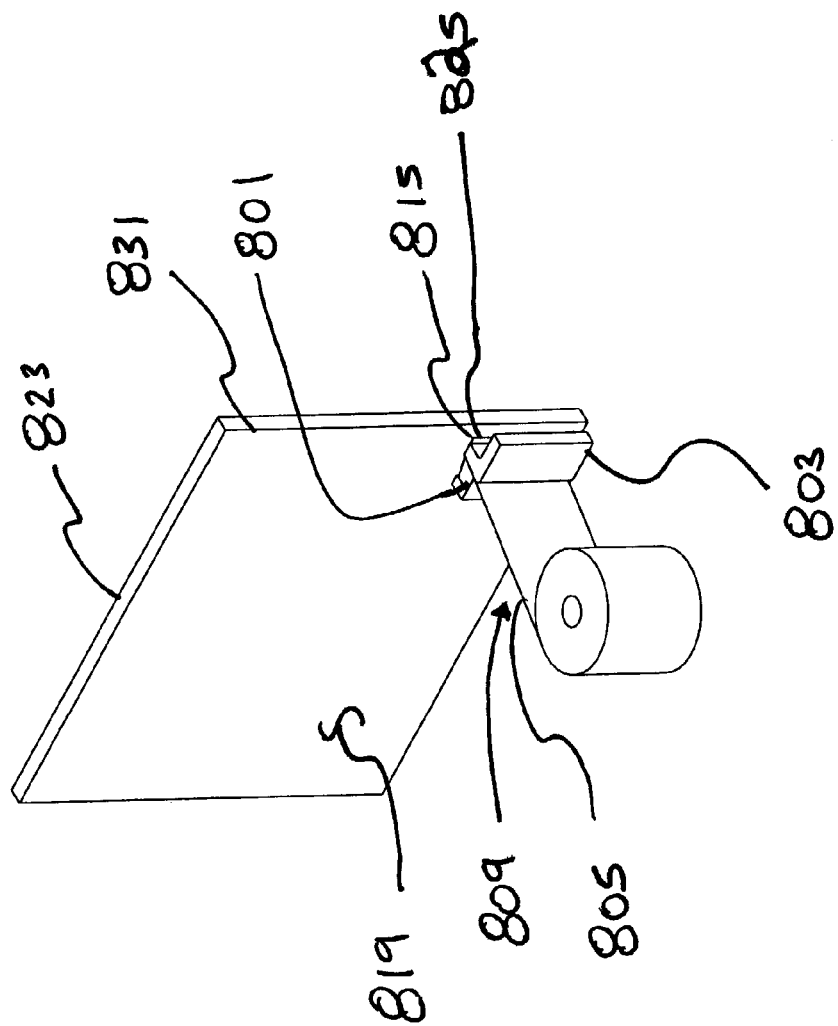
FIG. 24 is an additional isometric view useful for describing methods and apparatus in accordance with the present invention.

FIG. 24 is an additional isometric view useful for describing methods and apparatus in accordance with the present invention. In the embodiment of FIG. 24, first tool 801 and second tool 803 have been moved to a location proximate workpiece 823. In FIG. 24, it may be appreciated that tail 815 of masking material 805 is trapped between second tool 803 and workpiece 823. In FIG. 24, it may be appreciated that a first end 825 of masking material 805 has been positioned so that a first portion of an unmasked apron of workpiece 823 will extend between first end 825 of masking material 805 and an outer periphery 831 of workpiece 823. In the embodiment of FIG. 24, adhesive side 809 of masking material 805 is shown contacting a surface 819 of workpiece 823.

Figure 25:
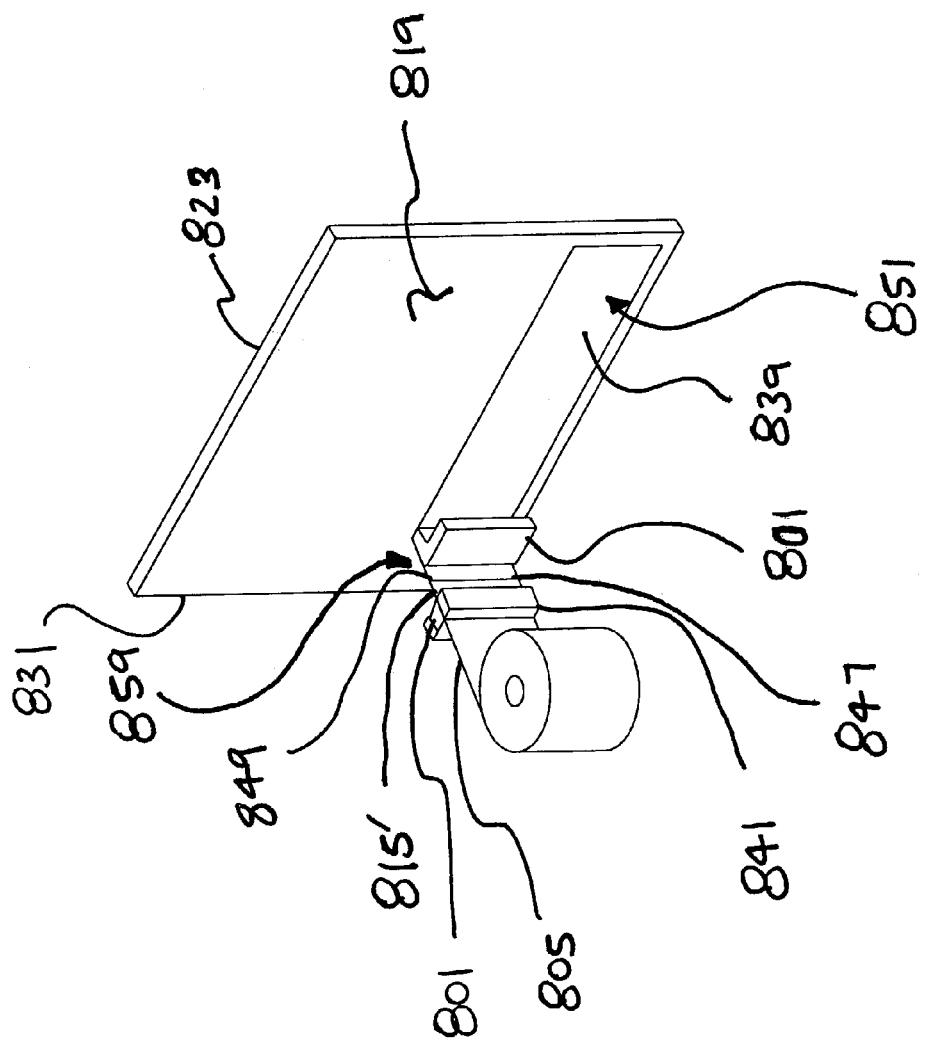
FIG. 25 is another isometric view useful for describing methods and apparatus in accordance with the present invention.

FIG. 25 is another isometric view useful for describing methods and apparatus in accordance with the present invention. In FIG. 25, it may be appreciated that a first section 839 of masking material 805 has been applied to surface 819 of workpiece 823. Also, in FIG. 25, it may be appreciated that first tool 801 has been moved to a new location, and that a third tool 841 has been moved into position so that a section of masking material 805 is trapped between first tool 801 and third tool 841.

In the embodiment of FIG. 25, a cut 847 has been formed in masking material 805. Cut 847 defines a second end 849 of a first strip 851 of masking material. In FIG. 25, it may be appreciated that cut 847 has been formed in a section of masking material 805 that is not adhered to workpiece 823. A second tail 815' of masking material 805 is shown extending beyond first tool 801. In FIG. 25, a first section 839 of first strip 851 is shown contacting workpiece 823 and a second section 859 of first strip 851 is shown extending away from workpiece 823. In some useful methods in accordance with the present invention, cut 847 is located such that a third portion of an unmasked apron will extend between second end 849 of first strip 851 and outer periphery 831 when second section 859 of first strip 851 is applied to workpiece 823.

Figure 26:
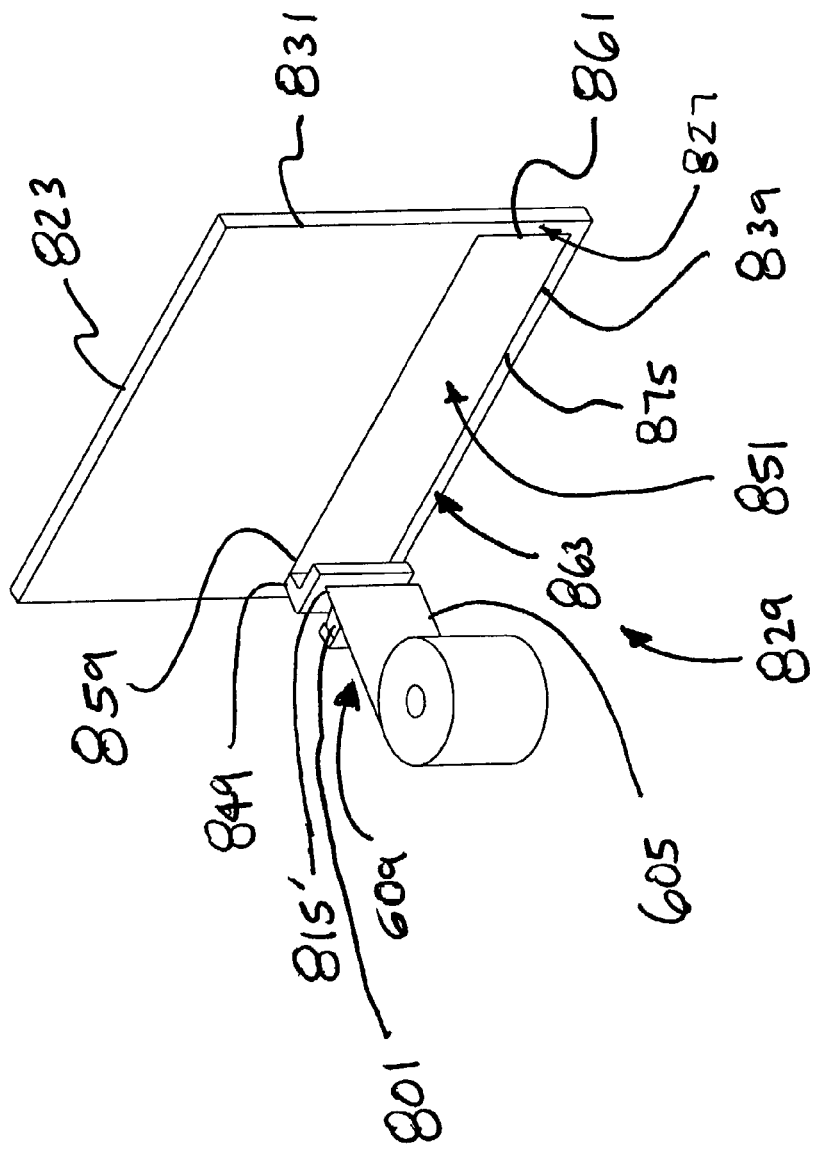
FIG. 26 is yet another isometric view useful for describing methods and apparatus in accordance with the present invention.

FIG. 26 is an additional isometric view useful for describing methods and apparatus in accordance with the present invention. In FIG. 26, first section 839 and second section 859 of first strip 851 are both shown contacting workpiece 823. In FIG. 26 it may be appreciated that first strip 851 is positioned on a workpiece 823 such that a first portion 827 of an unmasked apron 829 of workpiece 823 extends between first end 861 of first strip 851 and an outer periphery 831 of workpiece 823. Also in FIG. 26 it may be appreciated that first strip 851 is positioned on workpiece 823 such that a second portion 863 of unmasked apron 829 extends between a first side 875 of first strip 851 and outer periphery 831 of workpiece 823. Additionally in FIG. 26, it may be appreciated that first strip 851 has a length selected so that a third portion of unmasked apron 829 extends between second end 849 of first strip 851 and outer periphery 831. In the embodiment of FIG. 26, third tool 841 has been withdrawn from first tool 801 leaving adhesive side 809 of masking material 805 adhered to first tool 801. A second tail 815' is shown extending beyond first tool 801 in FIG. 26.

Figure 27:
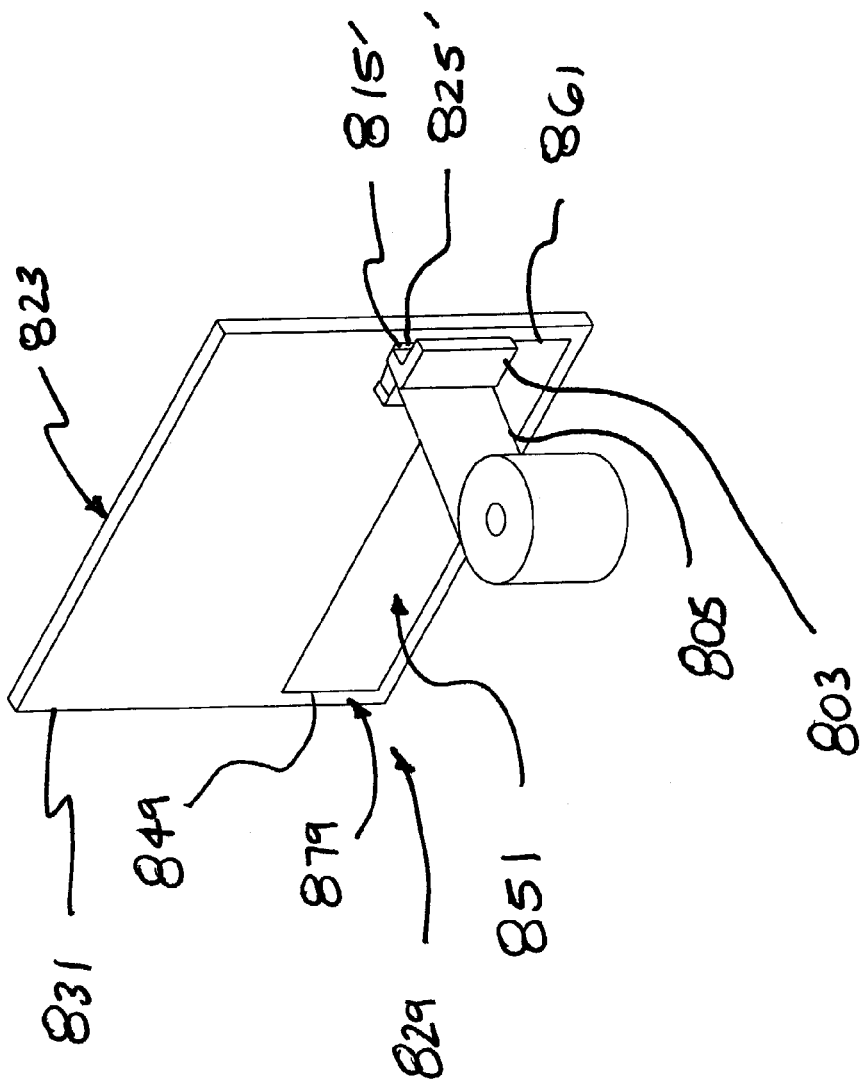
FIG. 27 is still another isometric view useful for describing methods and apparatus in accordance with the present invention.

FIG. 27 is still another isometric view useful for describing methods and apparatus in accordance with the present invention. In the embodiment of FIG. 27, second tail 815' of masking material 805 is trapped between second tool 803 and workpiece 823. In the embodiment of FIG. 27 a first end 825' of masking material 805 has been placed in general alignment with first end 861 of first strip 851. In FIG. 27 it may be appreciated that first strip 851 is dimensioned and located so that a third portion 879 of unmasked apron 829 of workpiece 823 extends between second end 849 of first strip 851 and outer periphery 831 of workpiece 823.

Figure 28:
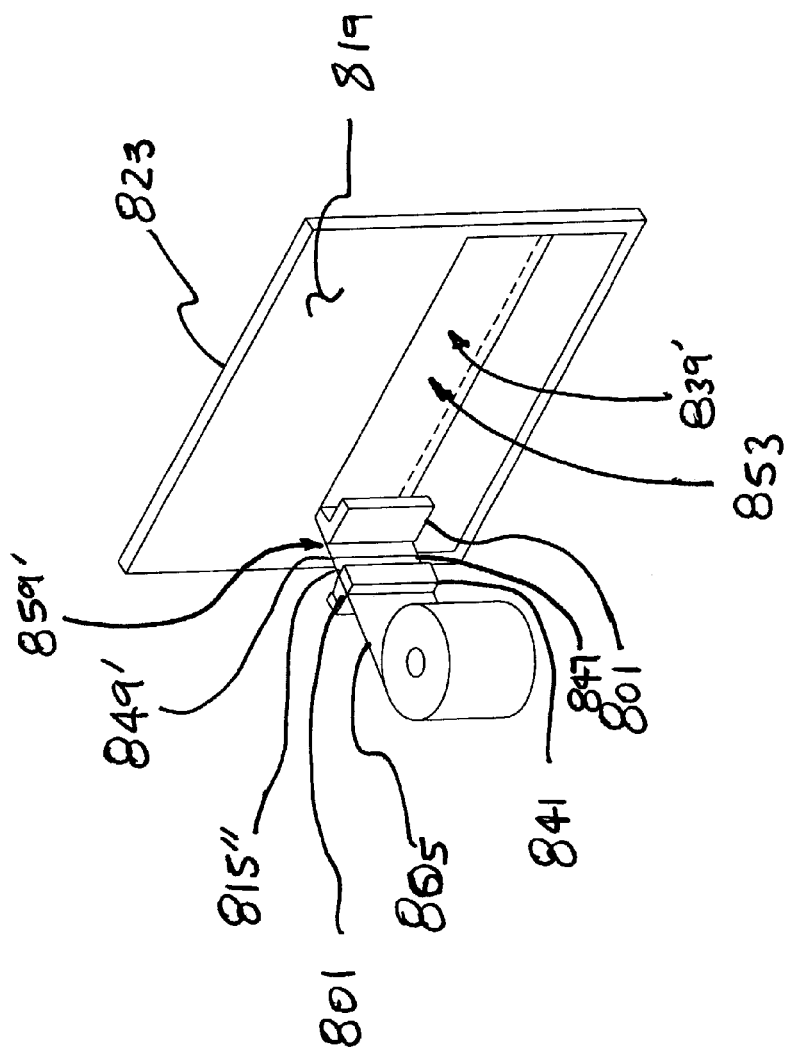
FIG. 28 is still another isometric view useful for describing methods and apparatus in accordance with the present invention.

FIG. 28 is another isometric view useful for describing methods and apparatus in accordance with the present invention. In FIG. 28, it may be appreciated that a first section of masking material 805 has been applied to surface 819 of workpiece 823. Also, in FIG. 28, it may be appreciated that first tool 801 has been moved to a new location, and that a third tool 841 has been moved into position so that a section of masking material 805 is trapped between first tool 801 and third tool 841. In the embodiment of FIG. 28, a cut 847 has been formed in masking material 805. Cut 847 defines a second end 849' of a second strip 853 of masking material. In FIG. 28, it may be appreciated that cut 847 has been formed in a section of masking material 805 that is not adhered to workpiece 823. A third tail 815" of masking material 805 is shown extending beyond first tool 801. In FIG. 28, a first section 839' of second strip 853 is shown contacting workpiece 823 and a second section 859' of second strip 853 is shown extending away from workpiece 823. In some useful methods in accordance with the present invention, cut 847 is located such that a third portion of an unmasked apron will extend beyond second end 849' of second strip 853 when second section 859' of second strip 853 is applied to workpiece 823.

Figure 29:
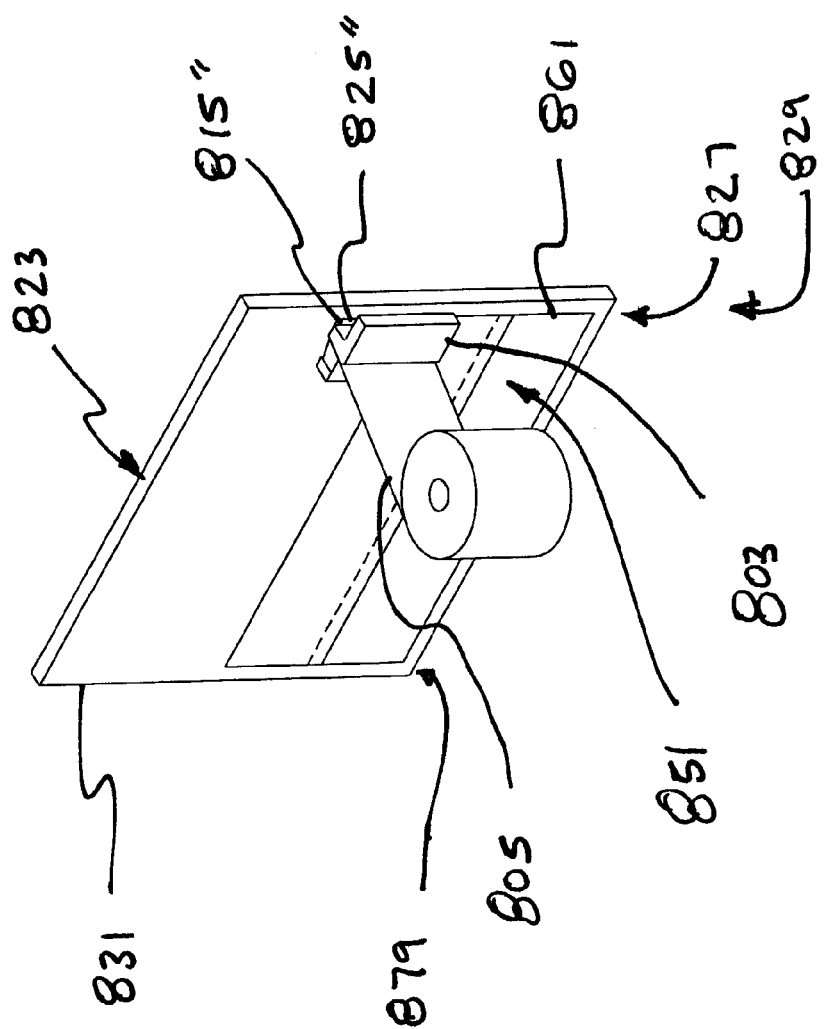
FIG. 29 is still another isometric view useful for describing methods and apparatus in accordance with the present invention.

FIG. 29 is still another isometric view useful for describing methods and apparatus in accordance with the present invention. In the embodiment of FIG. 29, third tail 815"of masking material 805 is trapped between second tool 803 and workpiece 823. In the embodiment of FIG. 29 a first end 825" of masking material 805 has been placed in general alignment with first end 861 of first strip 851. In FIG. 29 it may be appreciated that the first ends of the strips are located so that a first portion 827 of unmasked apron 829 of workpiece 823 extends between the first ends of the strips and outer periphery 831 of workpiece 823. In FIG. 29 it may also be appreciated that the length of the strips have been selected so that a third portion 879 of unmasked apron 829 of workpiece 823 extends between the second ends of the strips and outer periphery 831 of workpiece 823.

Figure 30:
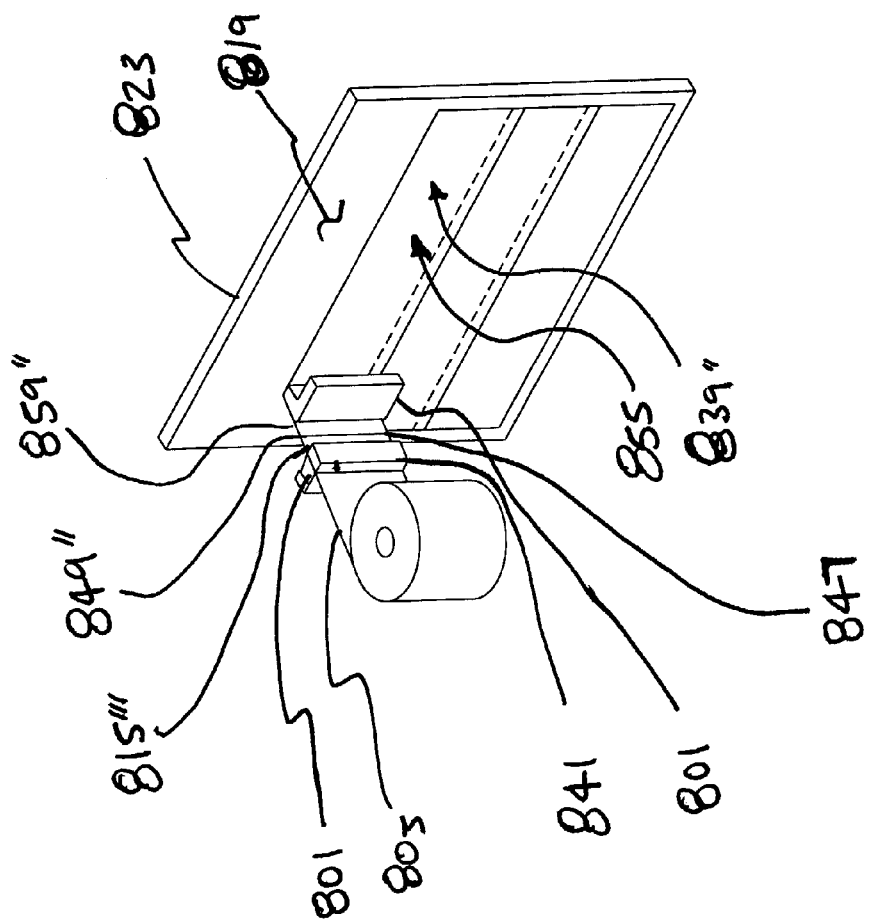
FIG. 30 is still another isometric view useful for describing methods and apparatus in accordance with the present invention.

FIG. 30 is another isometric view useful for describing methods and apparatus in accordance with the present invention. In FIG. 30, it may be appreciated that a first section of masking material 805 has been applied to surface 819 of workpiece 823. Also, in FIG. 30, it may be appreciated that first tool 801 has been moved to a new location, and that a third tool 841 has been moved into position so that a section of masking material 805 is trapped between first tool 801 and third tool 841. In the embodiment of FIG. 30, a cut 847 has been formed in masking material 805. Cut 847 defines a second end 849" of a third strip 855 of masking material. In FIG. 30, it may be appreciated that cut 847 has been formed in a section of masking material 805 that is not adhered to workpiece 823. A fourth tail 815''' of masking material 805 is shown extending beyond first tool 801. In FIG. 30, a first section 839" of third strip 855 is shown contacting workpiece 823 and a second section 859" of third strip 855 is shown extending away from workpiece 823. In some useful methods in accordance with the present invention, cut 847 is located such that a third portion of an unmasked apron will extend between second end 849" of third strip 855 and the outer periphery of workpiece 823 when second section 859" of third strip 855 is applied to workpiece 823.

Figure 31:
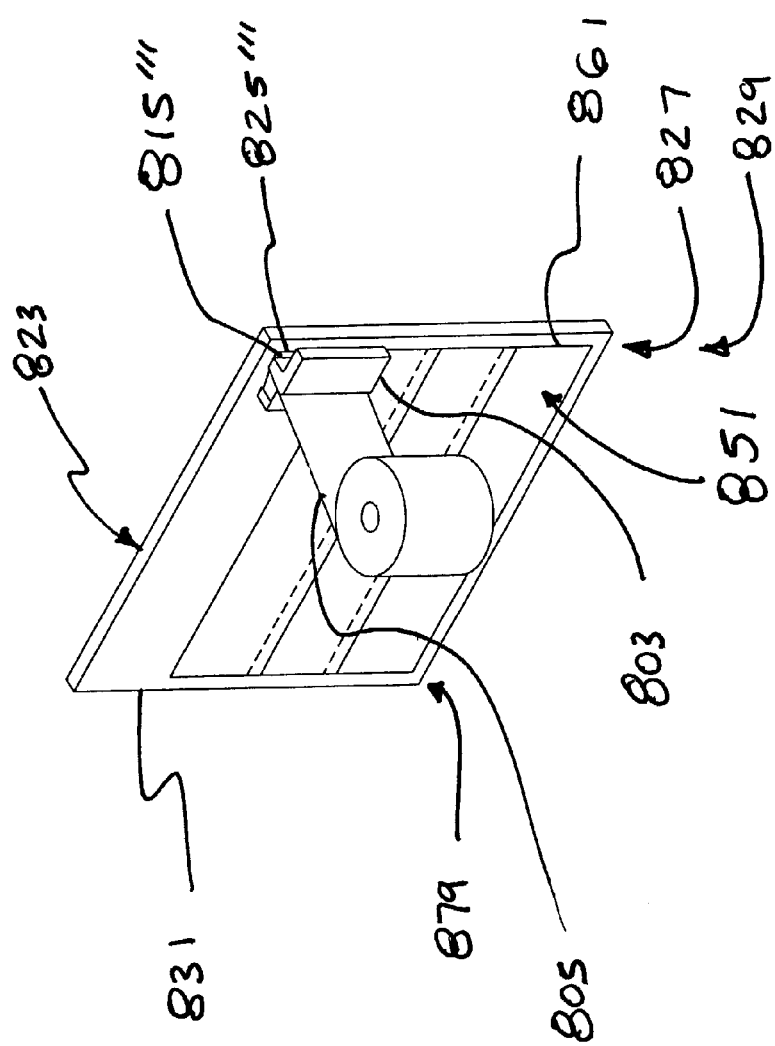
FIG. 31 is still another isometric view useful for describing methods and apparatus in accordance with the present invention.

FIG. 31 is still another isometric view useful for describing methods and apparatus in accordance with the present invention. In the embodiment of FIG. 31, fourth tail 815''' of masking material 805 is trapped between second tool 803 and workpiece 823. In the embodiment of FIG. 31 a first end 825''' of masking material 805 has been placed in general alignment with first end 861 of first strip 851. In FIG. 31 it may be appreciated that the first ends of the strips are located so that a first portion 827 of unmasked apron 829 of workpiece 823 extends between the first ends of the strips and outer periphery 831 of workpiece 823. In FIG. 31 it may also be appreciated that the length of the strips has been selected so that a third portion 879 of unmasked apron 829 of workpiece 823 extends between the second ends of the strips and outer periphery 831 of workpiece 823.

Figure 32:
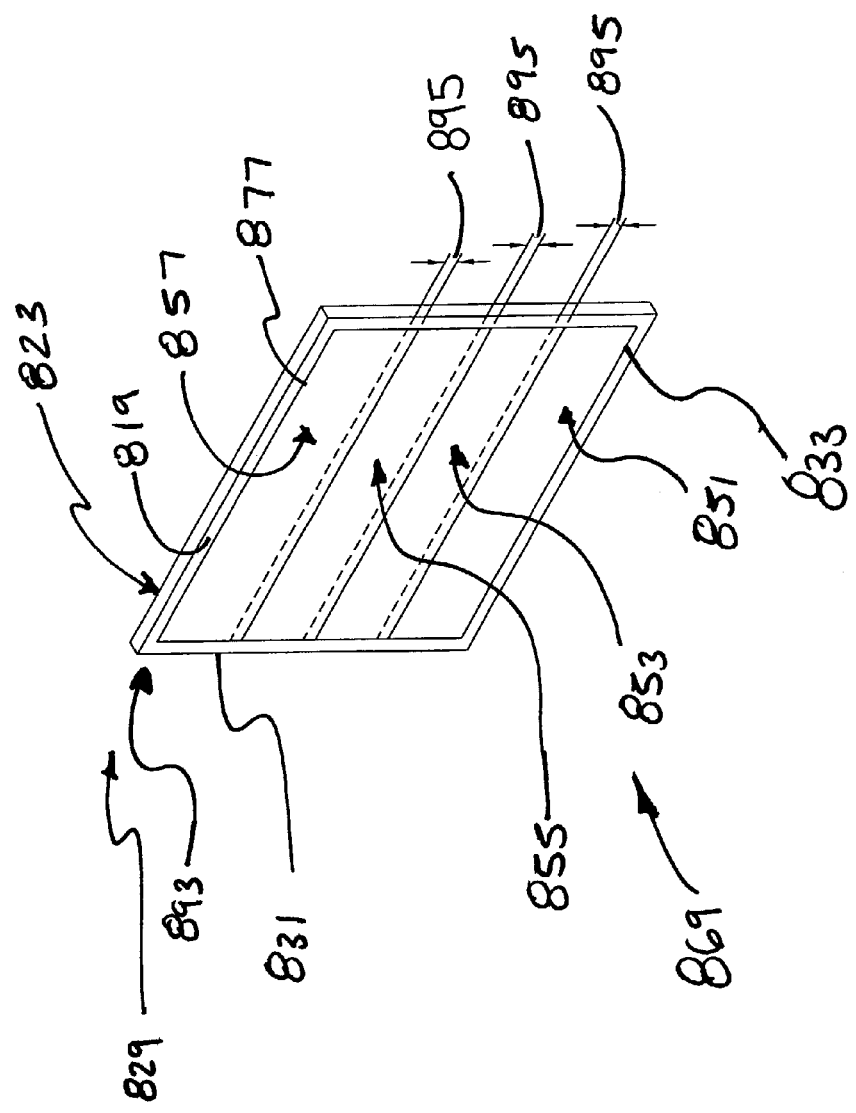
FIG. 32 is still another isometric view useful for describing methods and apparatus in accordance with the present invention.

FIG. 32 is another isometric view useful for describing methods and apparatus in accordance with the present invention. In FIG. 32, it may be appreciated that a final strip 857 has been applied to surface 819 of workpiece 823. In FIG. 32, it may also be appreciated that final strip 857 is positioned so that a fourth portion 893 of unmasked apron 829 extends between a second side 877 of final strip 857 and outer periphery 831 of workpiece 823.

In the embodiment of FIG. 32, first strip 851, second strip 853, third strip 855, and final strip 857 form a protective covering 869. In FIG. 32, it may be appreciated that protective covering 869 is sized and positioned so that an unmasked apron 829 of workpiece 823 extends between an outer periphery 833 of protective covering 869 and an outer periphery 831 of workpiece 823. In some particularly advantageous implementations, the width of the unmasked apron is large enough so that the unmasked apron can receive a sash, and small enough so that the protective covering protects a viewing portion of the pane.

In FIG. 32, final strip 857 is shown overlapping third strip 855 by an overlap dimension 895. Also in the embodiment of FIG. 32, third strip 855 overlaps second strip 853 by an overlap dimension 895 and second strip 853 overlaps first strip 851 by an overlap dimension 895. In some advantageous methods in accordance with the present invention, a first strip of masking material is placed on a workpiece in a position such that a second portion of an unmasked apron of the workpiece extends between a first side of the first strip and the outer periphery of the workpiece. A pre-selected number of additional strips are applied to the workpiece in an overlapping fashion according to a pre-selected overlap dimension so that a fourth portion of the unmasked apron extends between a second side of a final additional strip and the outer periphery of the workpiece. In some cases, the workpiece comprises a window pane and the first and second portions of the unmasked apron have widths that are large enough to allow the first and second portions of the unmasked apron to mate with a window sash. In some cases, the workpiece comprises a window pane and the first and second portions of the unmasked apron have widths that are small enough that the strips protect a viewing portion of the window pane.

Several forms of invention have been shown and described, and other forms will now be apparent to those skilled in art. It will be understood that embodiments shown in drawings and described above are merely for illustrative purposes, and are not intended to limit the scope of invention defined claims which follow.

What is claimed is:

1. A method comprising the steps of:
   trapping a masking material between a first tool and a second tool with a tail of the masking material extending beyond the second tool;
   directing a stream of gas to impinge on the tail to lay the tail across a face of the second tool;
   trapping the tail between the face of the second tool and a workpiece;
   moving the first tool away from the second tool while the tail is trapped between the face of the second tool and the workpiece so that the masking material is no longer trapped between the first tool and the second tool.

2. The method of claim 1 wherein the step of trapping the tail between the second tool and the workpiece comprises the step of positioning a first end of the masking material so that a first portion of an unmasked apron of the workpiece extends between the first end of the first strip and a periphery of the workpiece.

3. The method of claim 1 wherein the step of directing the stream of gas to impinge upon the tail includes the step of placing an air supply in fluid communication with an air knife.

4. The method of claim 1 further comprising the step of trapping the masking material between the first tool and a third tool.

5. The method of claim 4 further comprising the step of forming a cut in a section of the masking material that is not in contact with the workpiece.

6. The method of claim 4 further comprising the step forming a cut in a section of the masking material extending between the third tool and the workpiece.

7. The method of claim 1 further comprising the step of applying a pre-selected number of additional strips to the workpiece in an overlapping fashion according to a pre-selected overlap dimension so that a portion of the unmasked apron extends between a second side of a final additional strip and the outer periphery of the workpiece.

8. The method of claim 7 wherein the workpiece comprises a window pane and the portion of the unmasked apron has a width that is larger than a width of a mating surface of a window sash.

9. The method of claim 7 wherein the workpiece comprises a window pane and the portion of the unmasked apron has a width that is large enough to allow the portion of the unmasked apron to mate with a window sash.

10. The method of claim 9 wherein the width of the portion of the unmasked apron is small enough that the final strip protects the pane adjacent to the window sash.

11. The method of claim 1 wherein the step of trapping the tail between the second tool and the workpiece comprises the step of positioning the tail so that;
a first portion of an unmasked apron of the workpiece extends between the first end of the first strip and a periphery of the workpiece; and
a second portion of the unmasked apron extends between a first side of the masking material and the periphery of the workpiece.

12. The method of claim 11 wherein the workpiece comprises a window pane and the first portion of the unmasked apron has a width that is large enough to allow the first portion of the unmasked apron to mate with a window sash.

13. The method of claim 11 wherein the workpiece comprises a window pane and the first portion of the unmasked apron has a width that is larger than a width of a mating surface of a window sash.

14. The method of claim 11 wherein the workpiece comprises a window pane and the second portion of the unmasked apron has a width that is larger than a width of a mating surface of a window sash.

15. The method of claim 11 wherein the workpiece comprises a window pane and the second portion of the unmasked apron has a width that is large enough to allow the second portion of the unmasked apron to mate with a window sash.

16. The method of claim 15 wherein the width of the second portion of the unmasked apron is small enough that the first strip protects a portion of the pane adjacent to the window sash.

17. The method of claim 1 further including the step of moving the second tool by a first distance to apply a first section of the masking material onto the workpiece.

18. The method of claim 17 further including the step of creating a cut in the masking material to define a second end of a first strip.

19. The method of claim 18 wherein the step of creating a cut in the masking material to define the second end of the first strip comprises the step of locating the cut so that the first strip has a pre-selected length.

20. The method of claim 19 wherein the pre-selected length is less than a length of the workpiece.

21. The method of claim 19 wherein the first distance is less than a pre-selected length of the first strip so that a second section of the first strip is not in contact with the workpiece during the step of creating a cut in the masking material to define the second end of the first strip.

22. The method of claim 21 further including the step of adhering the second section of the first strip to the workpiece.

23. The method of claim 19 wherein the pre-selected length is selected so that a portion of an unmasked apron of the workpiece will extend between the second end of the first strip and an outer periphery of the workpiece when a second section of the first strip is applied to the workpiece.

24. The method of claim 23 wherein the workpiece comprises a window pane and the portion of the unmasked apron has a width that is large enough to allow the portion of the unmasked apron to mate with a window sash.

25. The method of claim 23 wherein the workpiece comprises a window pane and the portion of the unmasked apron has a width that is larger than a width of a mating surface of a window sash.

26. A method comprising the steps of:
trapping a masking material between a first tool and a second tool with a tail of the masking material extending beyond the second tool;
directing a stream of gas to impinge on the tail to lay the tail across a face of the second tool;
trapping the tail between the face of the second tool and a glass pane;
moving the first tool away from the second tool while the tail is trapped between the face of the second tool and the glass pane so that the masking material is no longer trapped between the first tool and the second tool.

27. A method comprising the steps of:
trapping a masking material between a first tool and a second tool with a tail of the masking material extending beyond the second tool;
directing a stream of gas to impinge on the tail to lay the tail across a face of the second tool;
trapping the tail between the face of the second tool and a glass pane, which is part of an insulating glass unit;
moving the first tool away from the second tool while the tail is trapped between the face of the second tool and the glass pane so that the masking material is no longer trapped between the first tool and the second tool.

28. A method comprising the steps of:
providing a masking material having an adhesive side and a non-adhesive side;
trapping the masking material between a first tool and a second tool such that a tail of the masking material extends beyond the second tool, the non-adhesive side of the masking material contacts the second tool, and the adhesive side of the masking material contacts the first tool;

directing a stream of gas to impinge on the tail to lay the tail of the masking material across a face of the second tool;

trapping the tail of the masking material between the face of the second tool and a glass pane so that the adhesive side of the masking material contacts the workpiece; and moving the first tool away from the adhesive side of the masking material while the tail of the masking material is trapped between the face of the second tool and the workpiece.

29. The method of claim 28, wherein the face of the second tool includes a low friction skin.

30. The method of claim 28, wherein the second tool includes a resilient pad located beneath the face of the second tool.

31. The method of claim 28, wherein the glass pane is a member of an insulating glass unit.

32. The method of claim 28, wherein directing the stream of gas comprises placing an air supply in fluid communication with an air knife.

33. The method of claim 28, further comprising the step of moving the second tool along the non-adhesive side of the masking material by a first distance thereby adhering a first section of the masking material to the glass pane.

34. The method of claim 33, further comprising the step of cutting the masking material along an un-adhered portion to create a strip of masking material including the first, adhered, section and a second, un-adhered, section.

35. The method of claim 34, further comprising the step of further moving the second tool along the non-adhesive side of the masking material by a second distance thereby adhering the second section of the strip of masking material to the glass pane.

* * * * *